US011006400B2

(12) United States Patent
Nogami et al.

(10) Patent No.: US 11,006,400 B2
(45) Date of Patent: May 11, 2021

(54) USER EQUIPMENTS, BASE STATIONS AND METHODS

(71) Applicant: Sharp Laboratories of America, Inc., Camas, WA (US)

(72) Inventors: Toshizo Nogami, Vancouver, WA (US); Zhanping Yin, Vancouver, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/994,746

(22) Filed: Jan. 13, 2016

(65) Prior Publication Data
US 2016/0212735 A1    Jul. 21, 2016

Related U.S. Application Data

(60) Provisional application No. 62/104,401, filed on Jan. 16, 2015.

(51) Int. Cl.
*H04W 72/04* (2009.01)
*H04L 5/00* (2006.01)
(Continued)

(52) U.S. Cl.
CPC ......... *H04W 72/042* (2013.01); *H04L 5/0048* (2013.01); *H04L 5/0053* (2013.01);
(Continued)

(58) Field of Classification Search
CPC ........... H04W 72/042; H04W 72/1289; H04W 27/0006; H04W 72/04; H04W 72/0446;
(Continued)

(56) References Cited

U.S. PATENT DOCUMENTS 7,899,081 B2 * 3/2011 Kwon ................... H04L 5/0007
370/343
2011/0235603 A1 * 9/2011 Cheng ................... H04L 5/0053
370/329
(Continued)

OTHER PUBLICATIONS

Ratasuk. LTE in unlicensed spectrum using licensed-assisted access. DOI:10.1109/GLOCOMW.2014.7063522. Dec. 12, 2014. [retrieved on Mar. 1, 2016] from the Internet<URL: http://ieeexplore.ieee.org/xpls/abs_all..jsp?arnumber=7063522> entier document.*
(Continued)

*Primary Examiner* — Hardikkumar D Patel
(74) *Attorney, Agent, or Firm* — Austin Rapp

(57) ABSTRACT

A user equipment (UE) is described that includes a control channel receiver configured to monitor, in a license-assisted-access (LAA) cell, a first physical downlink control channel (PDCCH) and to monitor a second PDCCH. The first PDCCH includes a DCI format having a field for indicating an occupied-OFDM-symbol configuration for a subframe in which the first PDCCH is detected. The second PDCCH is a PDCCH of which detection indicates a transmission of a PDSCH on the LAA cell. A reference signal receiver is configured to receive reference signals of which resource element position within the subframe is determined depending on the occupied-OFDM-symbol configuration. A shared channel receiver is configured to receive the PDSCH assuming the same antenna port is used as for the reference signals.

12 Claims, 26 Drawing Sheets

(51) Int. Cl.
*H04L 27/26* (2006.01)
*H04W 72/12* (2009.01)
*H04L 27/00* (2006.01)
*H04B 1/04* (2006.01)
*H04B 1/16* (2006.01)

(52) U.S. Cl.
CPC ..... *H04L 27/2602* (2013.01); *H04W 72/1289* (2013.01); *H04B 1/04* (2013.01); *H04B 1/16* (2013.01); *H04L 5/001* (2013.01); *H04L 27/0006* (2013.01)

(58) Field of Classification Search
CPC .......... H04W 72/12; H04B 1/04; H04B 1/16; H04B 7/2643; H04L 5/0048; H04L 5/0053; H04L 27/2602; H04L 5/00; H04L 1/0091; H04L 5/0007; H04L 5/0094; H04L 1/1812; H04L 1/0072; H04L 5/0032; H04L 5/0035; H04L 5/0051; H04L 5/001
See application file for complete search history.

(56) References Cited

U.S. PATENT DOCUMENTS

| | | | |
|---|---|---|---|
| 2012/0188978 A1* | 7/2012 | Yan | H04L 5/0051 370/330 |
| 2012/0195267 A1* | 8/2012 | Dai | H04B 7/06 370/329 |
| 2013/0010668 A1 | 1/2013 | Lin et al. | |
| 2013/0272262 A1 | 10/2013 | Li et al. | |
| 2013/0315114 A1 | 11/2013 | Seo et al. | |
| 2013/0322343 A1 | 12/2013 | Seo et al. | |
| 2014/0003387 A1 | 1/2014 | Lee et al. | |
| 2014/0029561 A1 | 1/2014 | Kim et al. | |
| 2014/0044105 A1 | 2/2014 | Bontu et al. | |
| 2014/0050191 A1 | 2/2014 | Kim et al. | |
| 2014/0050206 A1 | 2/2014 | Seo et al. | |
| 2014/0064237 A1 | 3/2014 | Lee et al. | |
| 2014/0112277 A1 | 4/2014 | Yang et al. | |
| 2014/0112280 A1 | 4/2014 | Lee et al. | |
| 2014/0126531 A1* | 5/2014 | Kang | H04L 5/0007 370/330 |
| 2014/0161002 A1 | 6/2014 | Gauvreau et al. | |
| 2014/0177527 A1 | 6/2014 | Lee et al. | |
| 2014/0185539 A1 | 7/2014 | Seo et al. | |
| 2014/0198733 A1* | 7/2014 | Yin | H04L 1/1812 370/329 |
| 2014/0204854 A1 | 7/2014 | Freda et al. | |
| 2014/0334395 A1 | 11/2014 | Lee et al. | |

OTHER PUBLICATIONS

3GPP TS 36.211 V12.7.0, "Evolved Universal Terrestrial Radio Access (E-UTRA); Physical Channels and Modulation (Release 9)," Dec. 1, 2009.
Ericsson, "Iniaitl Discussion on Solutions for Identified LAA Functionalities," 3GPP TSGP RAN WG1 Meeting #78bis, R1-144267, Oct. 6, 2014.
Nokia Networks, Nokia Corporation, "Short Control Signalling for LTE LAA," 3GPP TSG-RAN WG1 Meeting #78bis, R1-144186, Oct. 6, 2014.
Nokia Networks, Nokia Corporation, "Listen Before Talk and Channel Access," 3GPP TSG RAN W1 Meeting #78bis, R1-144187, Oct. 6, 2014.
Huawei, HiSilicon, "Potential Solutions for LAA-LTE Design," 3GPP TSG RAN WG1 Meeting #78bis, R1-143726, Oct. 6, 2014.
Samsung, "Discussion on Solutions for Required Functionalities and Design Targets for LAA," 3GPP TSG RAN WG1 #78bis, R1-143879, Oct. 6, 2014.
Motorola Mobility, "Physical Layer Options for LAA-LTE," 3GPP TSG RAN WG1 #78bis, R1-144236 Oct. 6, 2014.
Search Report and Written Opinion issued for International Application No. PCT/US2016/013437, dated Mar. 17, 2016.
Ratasuk, "LTE in unlicensed spectrum using licensed-assisted access," DOI: 10.1109/GLOCOMW.2014.7063522, Dec. 12, 2014.
Nielsen et al., "LTE in Unlicensed Spectrum: European Regulation and Co-existence Considerations," 3GPP workshop on LTE in unlicensed spectrum, RWS-140002, Sophia Antipolis, France, Jun. 13, 2014.

\* cited by examiner

USER EQUIPMENTS, BASE STATIONS AND METHODS

RELATED APPLICATIONS

This application is related to and claims priority from U.S. Provisional Patent Application No. 62/104,401, entitled "USER EQUIPMENTS, BASE STATIONS AND METHODS," filed on Jan. 16, 2015, which is hereby incorporated by reference herein, in its entirety.

TECHNICAL FIELD

The present disclosure relates generally to communication systems. More specifically, the present disclosure relates to user equipments (UEs), base stations and methods.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
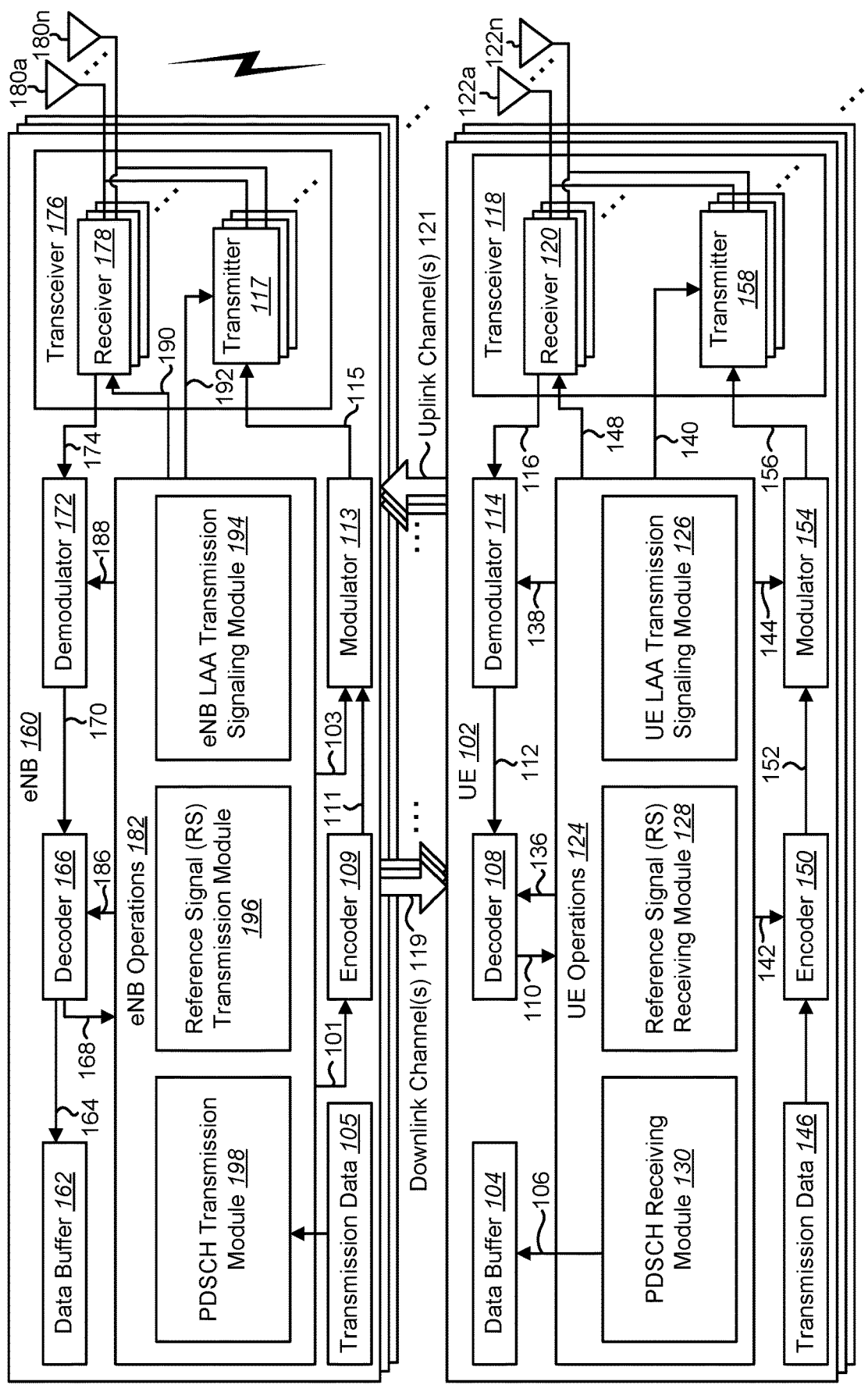
FIG. 1 is a block diagram illustrating one implementation of one or more evolved NodeBs (eNBs) and one or more user equipments (UEs) in which systems and methods for licensed assisted access (LAA) may be implemented.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may refer to any set of communication channels over which the protocols for communication between a UE and eNB that may be specified by standardization or governed by regulatory bodies to be used for International Mobile Telecommunications-Advanced (IMT-Advanced) or its extensions and all of it or a subset of it may be adopted by 3GPP as licensed bands (e.g., frequency bands) to be used for communication between an eNB and a UE. "Configured cells" are those cells of which the UE is aware and is allowed by an eNB to transmit or receive information. "Configured cell(s)" may be serving cell(s). The UE may receive system information and perform the required measurements on all configured cells. "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The systems and methods disclosed may involve carrier aggregation (CA). Carrier aggregation refers to the concurrent utilization of more than one carrier. In carrier aggregation, more than one cell may be aggregated to a UE. In one example, carrier aggregation may be used to increase the effective bandwidth available to a UE. The same TDD uplink-downlink (UL/DL) configuration has to be used for TDD CA in Release-10, and for intra-band CA in Release-11. In Release-11, inter-band TDD CA with different TDD UL/DL configurations is supported. The inter-band TDD CA with different TDD UL/DL configurations may provide the flexibility of a TDD network in CA deployment. Furthermore, enhanced interference management with traffic adaptation (eIMTA) (also referred to as dynamic UL/DL reconfiguration) may allow flexible TDD UL/DL reconfiguration based on the network traffic load.

It should be noted that the term "concurrent" and variations thereof as used herein may denote that two or more events may overlap each other in time and/or may occur near in time to each other. Additionally, "concurrent" and variations thereof may or may not mean that two or more events occur at precisely the same time.

A user equipment (UE) may comprise a higher layer processor configured to receive an RRC message to configure a monitoring of a first PDCCH. The first PDCCH may include a downlink control information (DCI) format having a field for indicating a reference signal resource configuration, the reference signal resource configuration specifying resource elements on reference signals that are mapped within a subframe. A control channel receiver may be configured to monitor the first PDCCH. A reference signal receiver may be configured to receive the reference signals based on the reference signal resource configuration when the monitoring of the first PDCCH is configured. A shared channel receiver may be configured to receive a PDSCH for which the same antenna port is used as for the reference signals.

The control channel receiver may be further configured to monitor a second PDCCH, the second PDCCH being a PDCCH of which detection indicates a transmission of the PDSCH. When cross-carrier scheduling is not configured for a secondary cell on which the PDSCH is received, the first PDCCH may be monitored on a primary cell and the second PDCCH may be monitored on the secondary cell.

The reference signals may be UE-specific reference signals. The reference signal resource configuration may indicate one of at least two states, a first state specifying that the resource elements are located the same as UE-specific reference signal resource elements for a normal subframe, and a second state specifying that the resource elements are located the same as UE-specific reference signal resource elements for a special subframe.

The reference signals may be cell-specific reference signals. The reference signal resource configuration may indicate one of at least two states, a first state specifying that the resource elements are located the same as common reference signal resource elements within a subframe, and a second state specifying that the resource elements are located the same as a part of the common reference signal resource elements within a subframe.

The reference signals may be cell-specific reference signals. The reference signal resource configuration may indicate one of at least two states, a first state specifying that the resource elements are located the same as common reference signal resource elements within a subframe, and a second state specifying that the resource elements are located the same as a time-domain shifted common reference signal resource elements within a subframe.

An evolved node B (eNB) may comprise a higher layer processor configured to send an Radio Resource Control (RRC) message to configure a user equipment (UE) for monitoring of a first PDCCH. The first PDCCH may include a DCI format having a field for indicating a reference signal resource configuration, the reference signal resource configuration specifying resource elements on reference signals that are mapped within a subframe. A control channel transmitter may be configured to transmit the first PDCCH. A reference signal transmitter may be configured to transmit the reference signals based on the reference signal resource configuration when the monitoring of the first PDCCH is configured. A shared channel transmitter may be configured to transmit a PDSCH for which the same antenna port is used as for the reference signals.

The control channel transmitter may be further configured to transmit a second PDCCH, the second PDCCH being a PDCCH of which detection indicates a transmission of the PDSCH. When cross-carrier scheduling is not configured for a secondary cell on which the PDSCH is transmitted, the first PDCCH may be transmitted on a primary cell and the second PDCCH may be monitored on the secondary cell.

The reference signals may be UE-specific reference signals. The reference signal resource configuration may indicate one of at least two states, a first state specifying that the resource elements are located the same as UE-specific reference signal resource elements for a normal subframe, and a second state specifying that the resource elements are located the same as UE-specific reference signal resource elements for a special subframe.

The reference signals may be cell-specific reference signals. The reference signal resource configuration may indicate one of at least two states, a first state specifying that the resource elements are located the same as common reference signal resource elements within a subframe, and a second state specifying that the resource elements are located the same as a part of the common reference signal resource elements within a subframe.

The reference signals may be cell-specific reference signals. The reference signal resource configuration may indicate one of at least two states, a first state specifying that the resource elements are located the same as common reference signal resource elements within a subframe, and a second state specifying that the resource elements are located the same as a time-domain shifted common reference signal resource elements within a subframe.

A user equipment (UE) may comprise a reference signal receiver configured to receive reference signals, in a subframe, based on what number subframe within a burst the subframe is. A shared channel receiver may be configured to receive a PDSCH for which the same antenna port is used as for the reference signals.

The reference signals may be UE-specific reference signals. When the subframe is not the last subframe in the burst, the resource elements may be located the same as UE-specific reference signal resource elements for a normal subframe. When the subframe is the last subframe in the burst, the resource elements may be located the same as UE-specific reference signal resource elements for a special subframe.

The reference signals may be cell-specific reference signals. When the subframe is not the last subframe in the burst, the resource elements may be located the same as common reference signal resource elements within a subframe. When the subframe is the last subframe in the burst, the resource elements may be located the same as a part of the common reference signal resource elements within a subframe.

The reference signals may be cell-specific reference signals. When the subframe is not the last subframe in the burst, the resource elements may be located the same as common reference signal resource elements within a subframe. When the subframe is the last subframe in the burst, the resource elements may be located the same as a time-domain shifted common reference signal resource elements within a subframe.

An evolved node B (eNB) may comprise a reference signal transmitter configured to transmit reference signals, in a subframe, based on what number subframe within a burst the subframe is. A shared channel transmitter may be configured to transmit a PDSCH for which the same antenna port is used as for the reference signals.

The reference signals may be UE-specific reference signals. When the subframe is not the last subframe in the burst, the resource elements may be located the same as UE-specific reference signal resource elements for a normal subframe. When the subframe is the last subframe in the burst, the resource elements may be located the same as UE-specific reference signal resource elements for a special subframe.

The reference signals may be cell-specific reference signals. When the subframe is not the last subframe in the burst, the resource elements may be located the same as common reference signal resource elements within a subframe. When the subframe is the last subframe in the burst, the resource elements may be located the same as a part of the common reference signal resource elements within a subframe.

The reference signals may be cell-specific reference signals. When the subframe is not the last subframe in the burst, the resource elements may be located the same as common reference signal resource elements within a subframe. When the subframe is the last subframe in the burst, the resource elements may be located the same as a time-domain shifted common reference signal resource elements within a subframe.

A user equipment (UE) may comprise a higher layer processor configured to receive an RRC message to configure a reference resource pattern. A reference signal receiver may be configured to receive reference signals, in a subframe, based on whether or not the reference resource pattern is configured. A shared channel receiver may be configured to receive a PDSCH for which the same antenna port is used as for the reference signals.

The reference signals may be UE-specific reference signals. When the reference resource pattern is not configured, the resource elements may be located the same as UE-specific reference signal resource elements for a normal subframe. When the reference resource pattern is configured, the resource elements may be located the same as UE-specific reference signal resource elements for a special subframe.

The reference signals may be cell-specific reference signals. When the reference resource pattern is not configured, the resource elements may be located the same as common reference signal resource elements within a subframe. When the reference resource pattern is configured, the resource elements may be located the same as a part of common reference signal resource elements within a subframe.

The reference signals may be cell-specific reference signals. When the reference resource pattern is not configured, the resource elements may be located the same as common reference signal resource elements within a subframe. When the reference resource pattern is configured, the resource elements may be located the same as time-domain shifted common reference signal resource elements within a subframe.

An evolved node B (eNB) may comprise a higher layer processor configured to send an RRC message to configure a reference resource pattern. A reference signal transmitter may be configured to transmit reference signals, in a subframe, based whether or not the reference resource pattern is configured. A shared channel transmitter may be configured to transmit a PDSCH for which the same antenna port is used as for the reference signals.

The reference signals may be UE-specific reference signals. When the reference resource pattern is not configured, the resource elements may be located the same as UE-specific reference signal resource elements for a normal subframe. When the reference resource pattern is configured, the resource elements may be located the same as UE-specific reference signal resource elements for a special subframe.

The reference signals may be cell-specific reference signals. When the reference resource pattern is not configured, the resource elements may be located the same as common reference signal resource elements within a subframe. When the reference resource pattern is configured, the resource elements may be located the same as a part of common reference signal resource elements within a subframe.

The reference signals may be cell-specific reference signals. When the reference resource pattern is not configured, the resource elements may be located the same as common reference signal resource elements within a subframe. When the reference resource pattern is configured, the resource elements may be located the same as time-domain shifted common reference signal resource elements within a subframe.

Licensed-assisted access (LAA) may support LTE in unlicensed spectrum. In a LAA network, the DL transmission may be scheduled in an opportunistic manner. For fairness utilization, an LAA eNB may perform functions such as clear channel assessment (CCA), listen before talk (LBT) and dynamic frequency selection (DFS) before transmission. When the eNB performs LBT, the eNB cannot transmit any signals including reference signals.

Due to LBT, a LAA DL subframe may have a reduced number of orthogonal frequency division multiplexing (OFDM) symbols occupied, and may start in the middle of a subframe. The reference signals in such a LAA downlink (DL) subframe may be different from a regular DL subframe.

On the other hand, for DL channel demodulation, LAA receiving UEs have to know which reference signals are actually transmitted. Otherwise, the UEs cannot obtain an accurate reference, which is derived by interpolating channel estimation results on the reference signals, for a channel demodulation. Therefore, a LAA subframe structure (occupied OFDM symbols) and reference signal configuration may be specified so that they can be determined by the LAA eNB and the LAA UEs without ambiguity.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more eNBs 160 and one or more UEs 102 in which systems and methods for LAA may be implemented. The one or more UEs 102 communicate with one or more eNBs 160 using one or more antennas 122a-n. For example, a UE 102 transmits electromagnetic signals to the eNB 160 and receives electromagnetic signals from the eNB 160 using the one or more antennas 122a-n. The eNB 160 communicates with the UE 102 using one or more antennas 180a-n.

The UE 102 and the eNB 160 may use one or more channels 119, 121 to communicate with each other. For example, a UE 102 may transmit information or data to the eNB 160 using one or more uplink channels 121. Examples of uplink channels 121 include a PUCCH and a PUSCH, etc. The one or more eNBs 160 may also transmit information or data to the one or more UEs 102 using one or more downlink channels 119, for instance. Examples of downlink channels 119 include a PDCCH, a PDSCH, etc. Other kinds of channels may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the eNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the eNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the UE operations module 124 may be implemented in hardware, software or a combination of both.

In general, the UE operations module 124 may enable the UE 102 to communicate with the one or more eNBs 160. The UE operations module 124 may include one or more of a UE LAA transmission signaling module 126, a reference signal (RS) receiving module 128 and a PDSCH receiving module 130.

The UE LAA transmission signaling module 126 may receive signaling for RS and PDSCH transmissions. The signaling may be explicit or implicit signaling. Alternatively, the UE LAA transmission signaling module 126 may be semi-statically configured for the RS and PDSCH transmissions.

The RS receiving module 128 may receive one or more reference signals. The PDSCH receiving module 130 may receive a PDSCH for which the same antenna port is used as for the reference signals.

The license assisted access (LAA) in unlicensed band for LTE, also known as LTE unlicensed or unlicensed LTE, allows opportunistic usage of unlicensed carrier for LTE transmissions.

In one approach, only DL LAA is performed. In another approach both UL and DL LAA transmissions may be performed. The LAA transmission may be assisted with a licensed band. Carrier aggregation (CA) may be performed for an unlicensed LAA cell operating with a licensed LTE cell.

In an LAA network, the DL transmission is scheduled in opportunistic manner. For fairness utilization, a LAA eNB 160 is required to perform functions such as clear channel assessment (CCA), listen before talk (LBT) and dynamic frequency selection (DFS). Thus, a LAA transmission cannot guarantee a DL transmission in the fixed subframe location that contains the DL signals.

When the eNB 160 performs LBT, the eNB 160 cannot transmit any signals including reference signals. Due to LBT, a LAA DL subframe may have a reduced number of OFDM symbols, and may start in the middle of a subframe. The reference signals in such a LAA DL subframe may be different from a regular DL subframe.

For DL channel demodulation, LAA UEs 102 have to know which reference signals are actually transmitted. Otherwise, the UEs 102 cannot obtain an accurate reference, which is derived by interpolating channel estimation results on the reference signals, for a channel demodulation.

An eNB 160 may transmit a dynamic indication to a UE 102 through a physical downlink control channel (PDCCH) or an enhanced physical downlink control channel (EPDCCH). The UE 102 may monitor PDCCH or EPDCCH to detect the dynamic indication. If detected, the UE 102 may receive reference signals based on the indication.

The dynamic indication may specify a reference signal pattern in a given subframe. In one approach, the reference signal pattern may be selected from the reference signal pattern for normal subframes for a licensed carrier. In another approach, the reference signal pattern may be selected from the reference signal patterns for special subframes for a licensed time-division duplexing (TDD) carrier.

In LTE license access, subframes are classified into two types of subframes. One type of subframe is the normal subframe that contains only either one of DL transmission and UL transmission. LTE license access with FDD has only the normal subframe. The other type of subframe is the special subframe that contains three fields downlink pilot time slot (DwPTS), guard period (GP) and uplink pilot time slot (UpPTS). DwPTS and UpPTS are durations reserved for DL transmission and UL transmission, respectively. The types of subframes are discussed in more detail in connection with FIG. 9.

UE-specific reference signals (UE-RSs) associated with PDSCH may be transmitted on antenna port 7-14 in transmission Mode 8, 9 and 10. UE-RSs are present and are a valid reference for PDSCH demodulation only if the PDSCH transmission is associated with the corresponding antenna ports. UE-RSs are transmitted only on the physical resource blocks upon which the corresponding PDSCH is mapped. More detail on UE-RSs is provided in connection with FIGS. 10-13.

Demodulation reference signals (DM-RSs) associated with EPDCCH may be transmitted on antenna port 107-110. DM-RSs are present and are valid reference for EPDCCH demodulation only if the EPDCCH transmission is associated with the corresponding antenna ports. They are transmitted only on the physical resource blocks upon which the corresponding EPDCCH is mapped. Resource elements (REs) on which antenna port 107-110 DM-RSs are mapped may be the same as those for antenna port 7-10 UE-RSs (i.e., the REs shown in FIGS. 10-13), respectively.

Cell-specific reference signals (CRSs) may be transmitted on all DL normal subframe and DwPTS in a cell supporting PDSCH transmission. CRSs are transmitted on one or several of antenna ports 0-3. More detail on CRSs is provided in connection with FIG. 14.

As described above, in an LAA network, the DL transmission may be scheduled in opportunistic manner. For co-existence with other networks on the same carrier, such as WiFi or LAA of the same or different operator, a LAA eNB 160 is required to perform some functions, e.g. clear channel assessment (CCA), listen before talk (LBT) and dynamic frequency selection (DFS). Thus, a LAA transmission cannot guarantee a DL transmission in the fixed subframe location that contains the synchronization signals.

Therefore, a first LAA subframe transmission may need to perform carrier sensing, and if there is no ongoing transmissions, the LAA subframe may be transmitted. Otherwise, the LAA cell should defer the transmission, and perform clear channel assessment (CCA) again at the next subframe boundary.

In LAA, the serving cell should be synchronized with a licensed cell with a maximum timing advance difference of 33 microseconds. The time used for carrier sensing and CCA will be removed from the first LAA subframe transmission. Thus, the first LAA subframe may reserve several OFDM symbols for CCA (e.g. 1 or 2 or 3 OFDM symbols can be used for carrier sensing). If the channel is idle in the reserved period, a LAA subframe can be transmitted. The first LAA subframe may be a reduced LTE subframe that has fewer OFDM symbols due to removing the reserved length for carrier sensing.

To provide fairness to other networks on the same unlicensed carrier, the eNB 160 may configure a maximum number of continuous subframe transmissions k in a LAA cell (i.e., a set of LAA subframes or a burst of LAA subframes). The maximum transmission time in an unlicensed carrier may be different in different regions and/or countries based on the regulatory requirements. For example, the maximum transmission time of an unlicensed transmission in Japan is approximately 4 milliseconds (ms); the maximum transmission time of an unlicensed transmission in Europe is 10 ms. Therefore, in one approach, the maximum number of continuous subframe transmissions k may be implicitly determined by the region/country regulator requirement. In another approach, the maximum number of continuous subframe transmissions k may be explicitly configured by higher layer signaling. An example of a subframe set transmission is discussed in connection with FIG. 15. An example of LAA coexistence with other unlicensed transmissions is described in connection with FIG. 16.

The eNB 160 and the UE 102 may perform rate matching. The PDSCH and EPDCCH may be sequentially mapped to REs on OFDM symbols other than a couple of leading OFDM symbols within a subframe. When some other signals such as CRS and UE-RS are mapped in that region, or when LBT is performed, there are at least two approaches to avoid collision between the signals or null elements and the PDSCH. One approach is to skip PDSCH mapping on such REs without an increment of the PDSCH symbol counter. This process may be referred to as "the signal or the null elements is considered in a rate matching process" or more simply "the signals or the null elements are rate-matched."

The other approach is to skip PDSCH mapping on such REs with an increment of the PDSCH symbol counter. This causes the dropping of the PDSCH symbols that were supposed to be mapped on those REs. This process may be referred to as "the puncturing of the PDSCH symbols" or "the signals or the null elements are not rate matched."

For the LAA carrier, the eNB 160 may perform LBT for ensure CCA prior to starting DL transmission. After ensuring CCA, the eNB 160 may start to transmit DL signals immediately, otherwise some other nodes might begin to use the carrier.

It should be noted that a PDSCH transmission completes within a subframe. More specifically, a DL grant for the PDSCH is sent within the same subframe. This means that a UE does not know whether the PDSCH intended for the UE exists in the subframe before the UE detects the DL grant in the same subframe. Error correction coding and decoding for PDSCH are not performed across subframes. The association between PDSCH and reference signals is guaranteed only within a subframe, which means the PDSCH in a given subframe can be demodulated only by using the reference signals in that subframe. Furthermore, PDSCH parameters (e.g., Physical Resource Blocks (PRB) assignment, Modulation and Coding Scheme (MCS), Hybrid Automatic Repeat reQuest (HARQ) process number, etc.) are determined per subframe.

Figure 17:
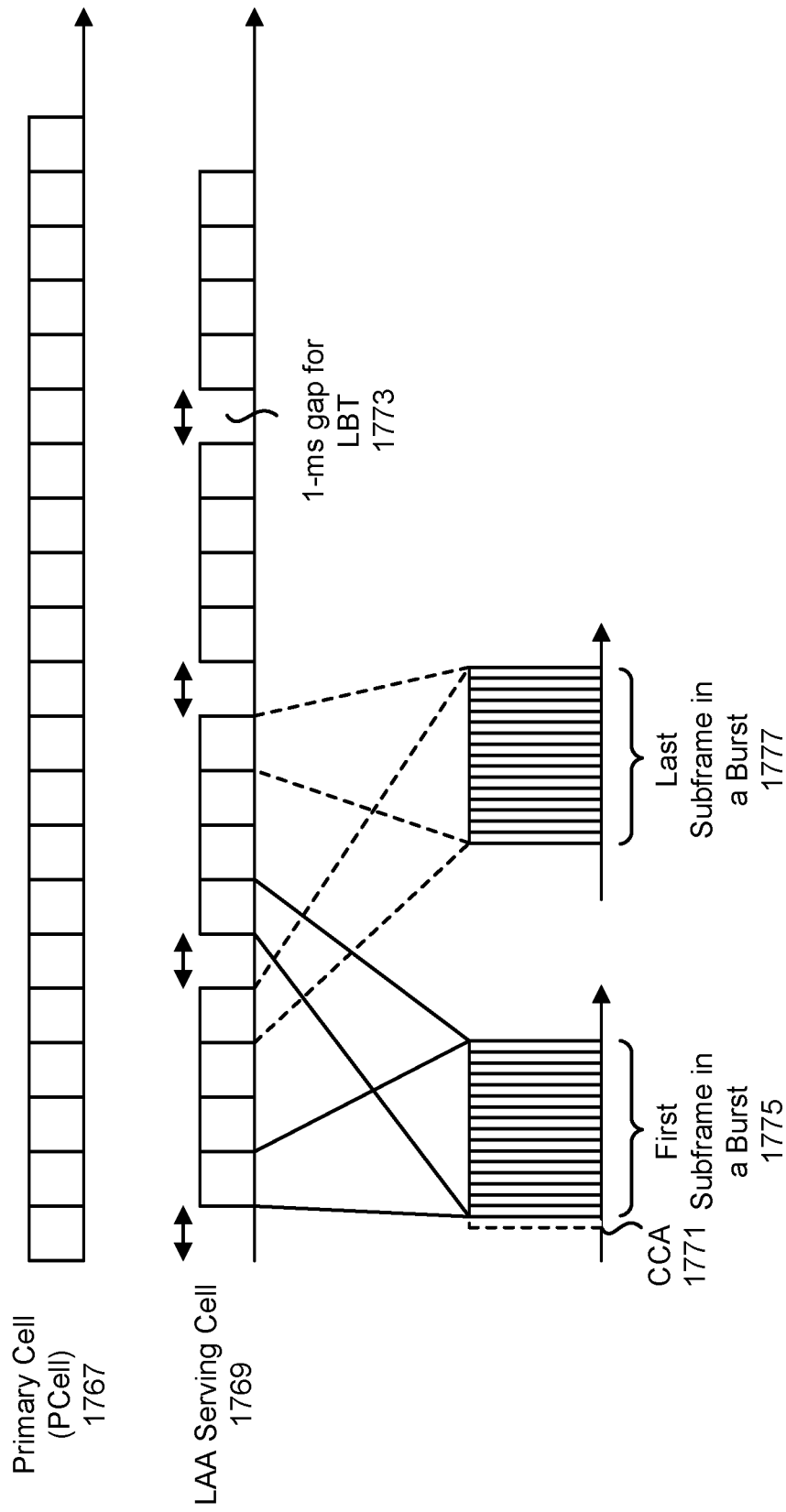
FIG. 17 illustrates an example of a LAA transmission gap due to listen before talk (LBT)

Given that PDSCH is transmitted in this subframe base manner, an effective way to perform LBT is to perform LBT just before or just after subframe boundaries. If LBT is performed in the middle of a subframe and the PDSCH starts and ends at subframe boundaries, at least a 1 ms gap might be needed between DL transmission bursts. This is illustrated in FIG. 17.

In one approach to collision avoidance between LBT and RS, LBT may be performed in the last part of a subframe. As discussed, an LAA SCell may be operated with a PCell in a licensed band. It may be assumed that an LBT is performed within an OFDM symbol or two. Once the eNB 160 ensures that the channel is clear, the eNB 160 is allowed to transmit DL signals within consecutive N subframes (referred to as "burst") starting just after the subframe where the LBT is performed. The maximum occupied time (i.e., N ms) for an eNB 160 may be determined based on regional regulatory requirements. Also, these parameters may be configured by the eNB 160. Thus, the maximum occupied time (i.e., N ms) for an eNB 160 may be a fixed value (e.g. 4 subframes (4 ms)) or may be configured by the eNB 160. It should be noted that more than one LAA SCell may be configured.

The eNB 160 can transmit up to N subframes after performing LBT. However, at the last part of the last (i.e., the N-th) subframe in the burst, the eNB 160 may stop to transmit DL signals and perform LBT for the next burst. To provide a time period (also referred to as a gap or duration) to perform LBT, signals/channels (including UE-RS, DM-RS, CRS and PDSCH) are not mapped on the last M OFDM symbol(s).

Since the start of a subframe aligns with the subframe boundary, the CRS pattern of a normal DL subframe can be applied. However, when M is greater than 2, then some of the CRSs may not be mapped, as is in a special subframe.

Figure 18:
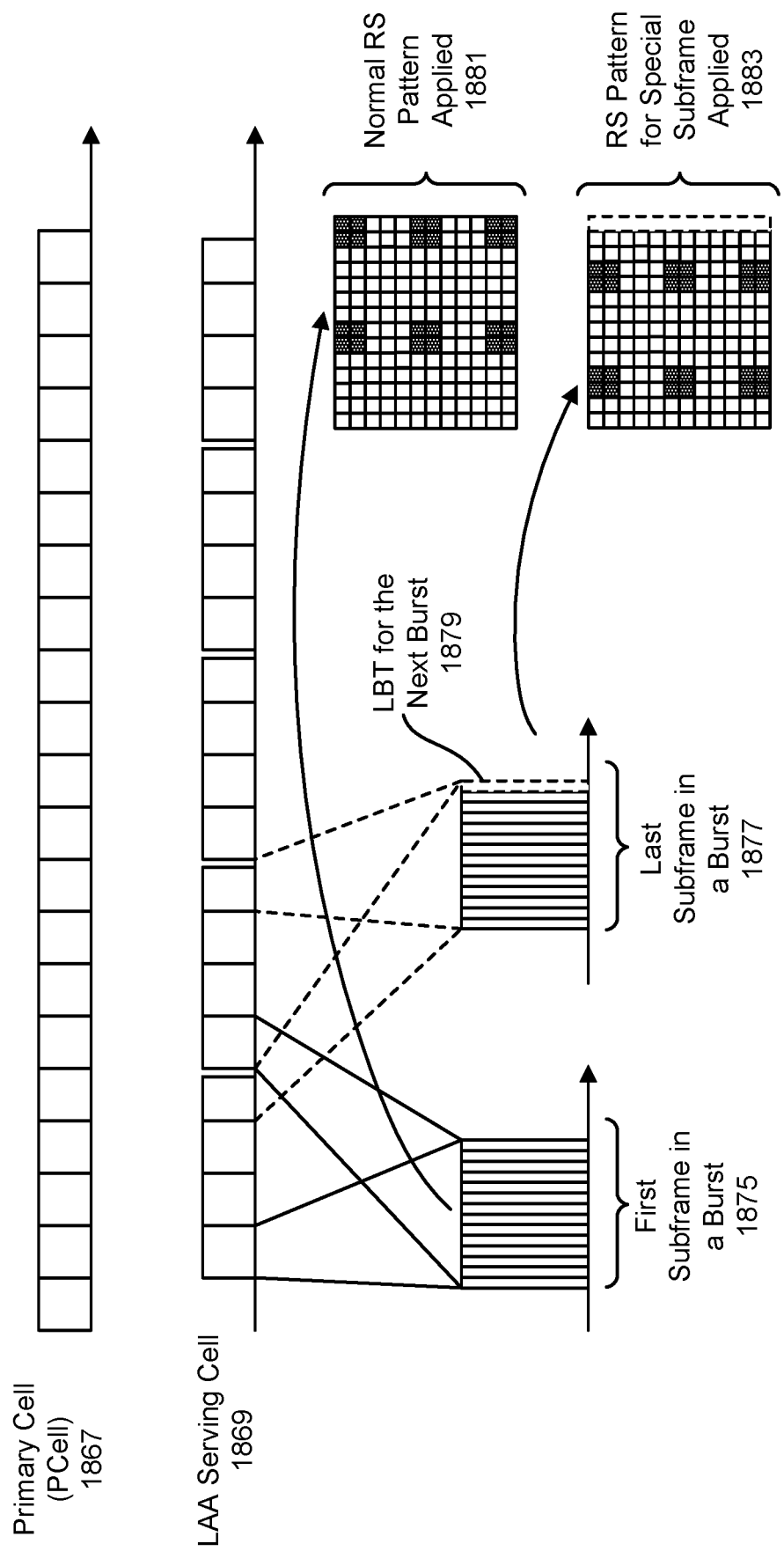
FIG. 18 illustrates an example of performing LBT at the last part of a subframe.

For the UE-RS pattern, if M=1 or 2 and if the UE-RS pattern for a normal subframe is used in this subframe, the UE-RS for PDSCH and DM-RS for EPDCCH on the last M OFDM symbol(s) are not available. To avoid such a situation, the UE-RS pattern for a special subframe may be applied in the last subframe in a burst, even if that subframe is not a special subframe (e.g., that subframe is a normal subframe). In the other subframes, including the first subframe, the UE-RS pattern for a normal subframe may still be used, as illustrated in FIG. 18.

Figure 19:
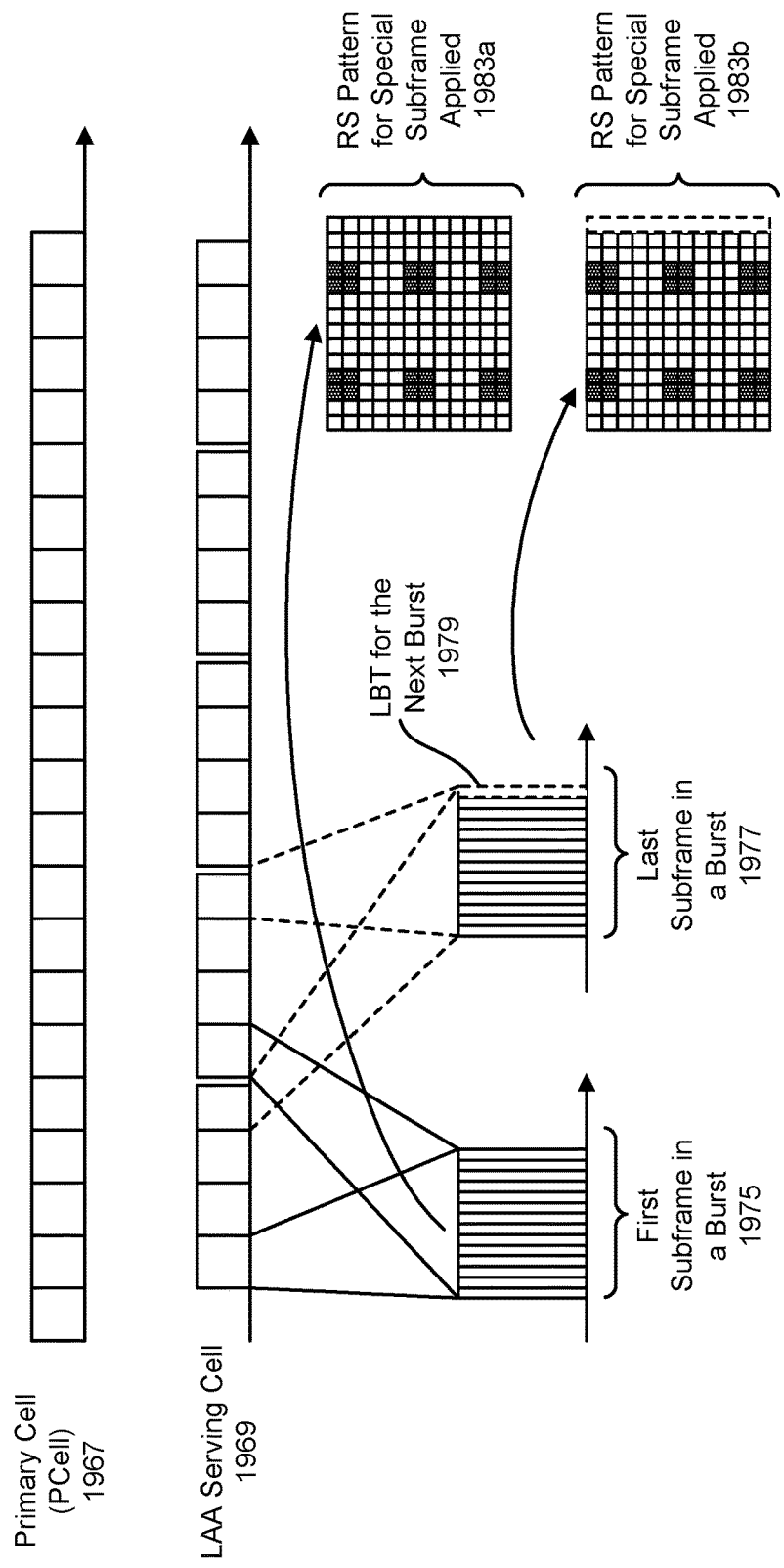
FIG. 19 illustrates another example of performing LBT at the last part of a subframe.

In another approach to avoid the collision between UE-RS and LBT in which LBT is performed in the last part of the subframe, a UE-RS pattern for special subframe may be applied in all subframes on LAA carrier, as illustrated in FIG. 19. In this instance, the eNB 160 may configure the UE 102 with an RS pattern (e.g., an RS pattern for special subframe) for the LAA SCell. The UE 102 may detect the RSs based on the RS pattern. Alternatively, the eNB 160 may just indicate that the SCell is an LAA SCell. In this implementation, the UE 102 may detect the RSs based whether the SCell is indicated as LAA.

Furthermore, the above schemes can be applied to the case where the LBT can be performed at any time and a PDSCH transmission can start in the middle of a subframe. As mentioned before, the maximum occupied time (i.e., N ms) for an eNB 160 may be determined based on regional regulatory requirements. When the maximum occupied time is applied to the case, the PDSCH transmission has to end in the middle of the subframe that is N ms later from the starting subframe. For example, the eNB 160 ensures CCA and then starts to transmit DL signals at the 8th OFDM symbol in a normal subframe k. If the regional regulation allows up to 4 ms transmission, the eNB 160 has to terminate at the 7th OFDM symbol in the subframe k+4. This means any DL signals (including PDSCH, CRS and UE-RS) cannot mapped later than the 7th OFDM symbol in the subframe k+4.

If the number of actually available REs for PDSCH transmission in the first or the last subframe in a burst is very small due to the timing of CCA and the maximum occupied time, effective data might not be carried through such PDSCH. The reason is that not only the effective data but also parity bits for a forward error-correction coding and a cyclic redundancy check coding have to be transmitted via the PDSCH. In this instance, it might be better to drop PDSCH transmission in such subframe. Therefore, whether a RS pattern can be applied depends on how many symbols are in the last subframe to terminate at N ms for a LAA subframe burst.

In one example, if the number of symbols in the last subframe of the burst is less than X OFDM symbols, then the last subframe should be dropped. For instance, if X=3 and only 1 or 2 OFDM symbols are available for DL transmission in the last subframe, the last subframe should be dropped. However, if the number of symbols in the last subframe of the burst is greater than or equal to X OFDM symbols, then the RS pattern for a special subframe can be applied. For instance, if X=3 and 3 or more OFDM symbols are available for DL transmission in the last subframe, then the RS pattern for a special subframe can be applied.

In the ending subframe, REs in the rear part are not available for DL transmissions including the RS. To avoid allocating the RS in that region, the RS pattern for a special subframe (e.g., UE-RS for special subframe configuration 1, 2, 6 or 7) having the same number of occupied OFDM symbols as the ending subframe may be applied to that subframe. RE mapping of the PDSCH may follow PDSCH RE mapping for the special subframe. Alternatively, RE mapping of PDSCH might not follow PDSCH RE mapping for the special subframe, but may be determined depending on the starting OFDM symbol for PDSCH RE mapping within the starting subframe. Similarly, CRS patterns for normal or special subframes can be applied so that CRSs are not mapped in the rear part of the ending subframe.

In a second approach to collision avoidance between LBT and RS, LBT may be performed in the beginning part of a subframe. In this approach, the eNB 160 may perform LBT at the beginning part of a subframe. Once the eNB 160 ensures CCA, the eNB 160 may transmit up to N subframes starting with the subframe where the LBT is performed. In this case, at the first part of the first subframe in the burst, the eNB 160 may stop to transmit DL signals. To keep a gap to perform LBT, any signals/channels (including UE-RS, DM-RS, CRS, PDSCH and (E)PDCCH) are not mapped on the leading M OFDM symbol(s). If M=1 or 2, CRS on the leading M OFDM symbol(s) are not available.

For UE-RS, since the end of a subframe aligns with the subframe boundary, the UE-RS pattern of a normal DL subframe may be applied. In this case, if the shifted CRS collides with UE-RS, the UE-RS can be dropped. Alternatively, the UE-RS pattern may be also shifted in the same manner as the CRSshifting. In this case, some of the shifted UE-RS may get beyond the latter subframe boundary. Thus, such UE-RS may be dropped. Alternatively, the shifted pattern of the UE-RS that is for special subframes (e.g. UE-RS for special subframe configuration 1, 2, 6 or 7 with normal cyclic prefix (CP) or UE-RS for special subframe configuration 1, 2, 3 5, or 6 with extended CP) may be used so that all shifted UE-RS REs are located within the subframe.

Figure 20:
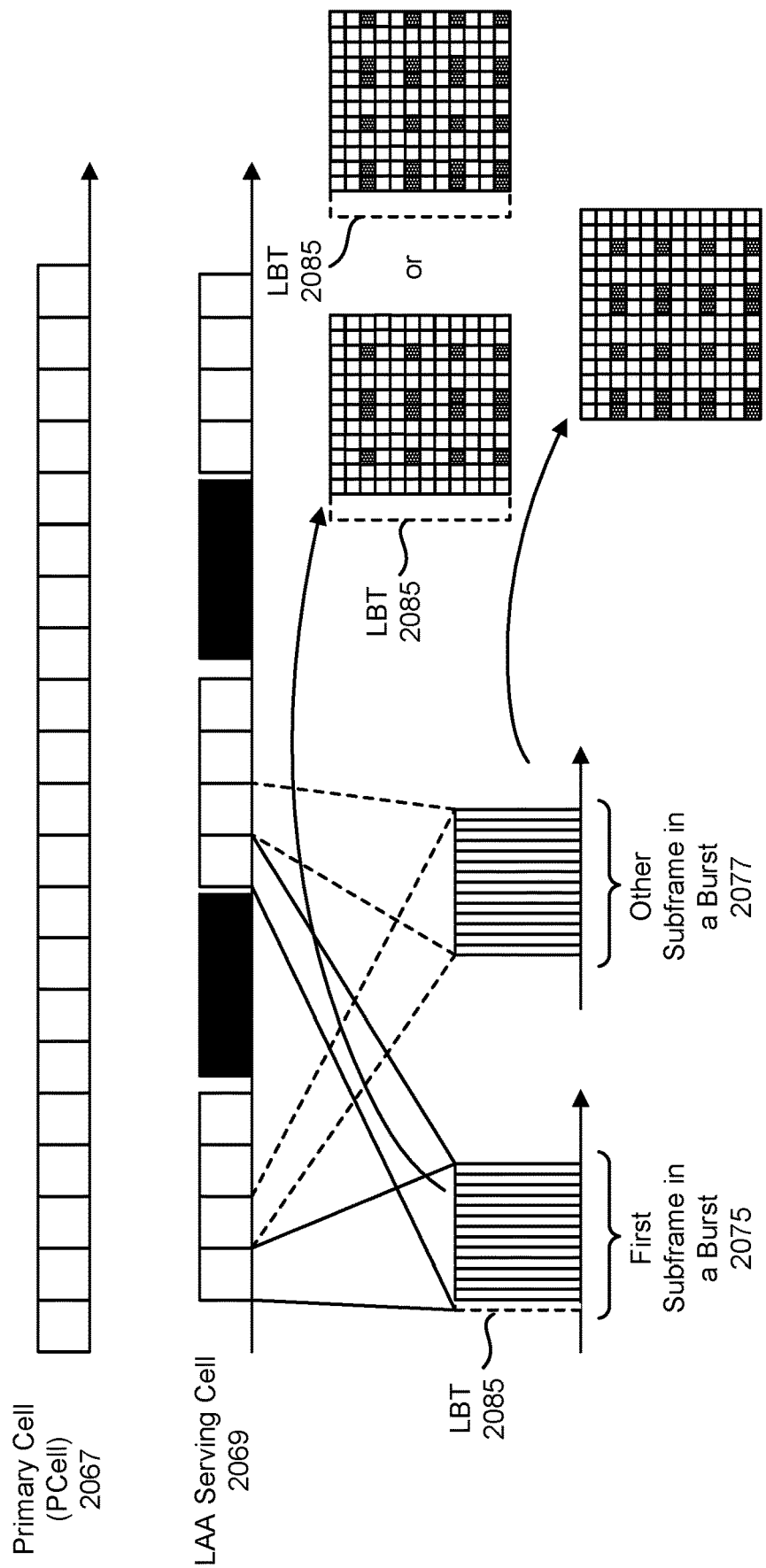
FIG. 20 illustrates an example of performing LBT at the first part of a subframe.
Figure 21:
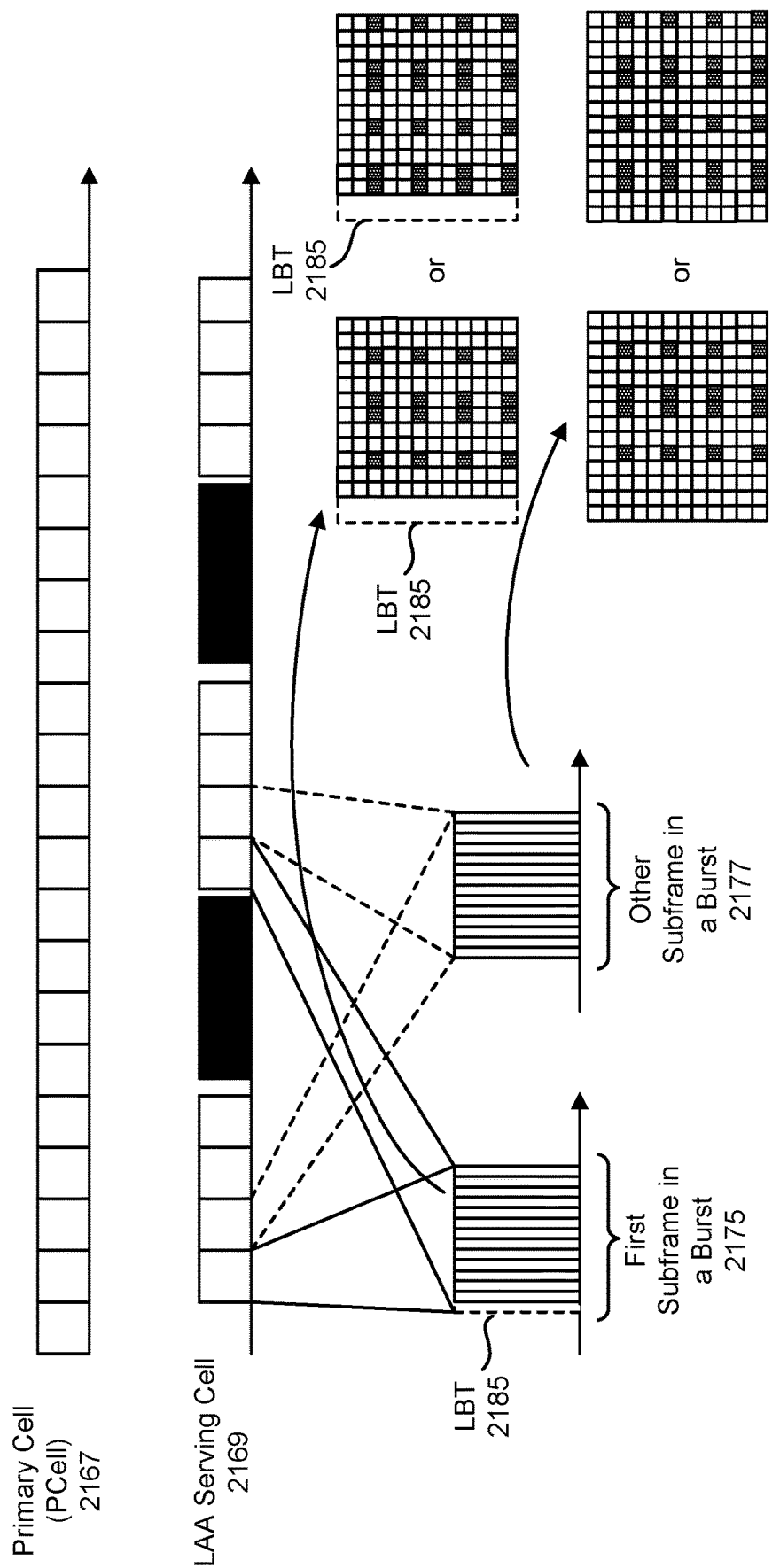
FIG. 21 illustrates another example of performing LBT at the first part of a subframe.
Figure 22:
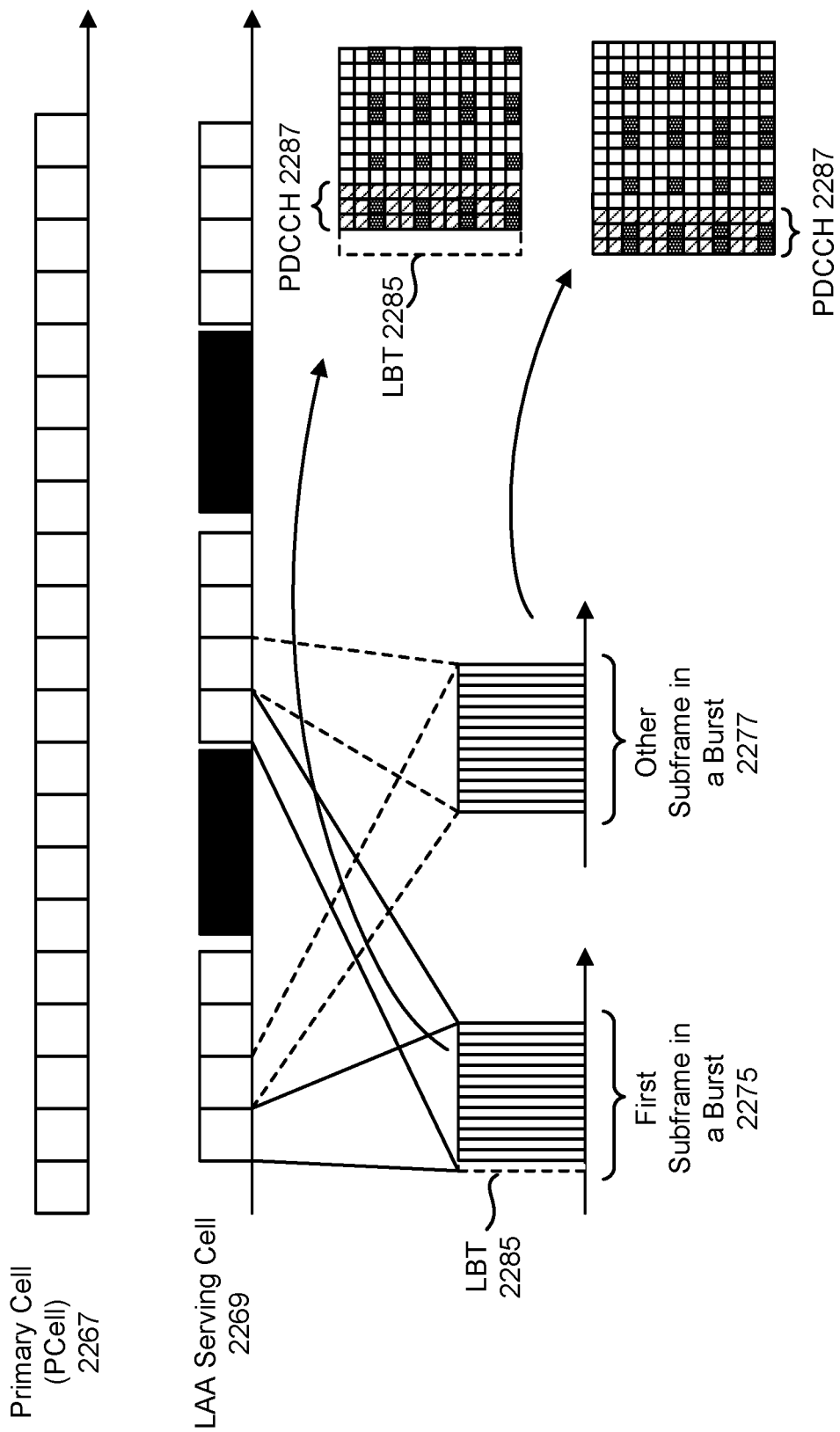
FIG. 22 illustrates yet another example of performing LBT at the first part of a subframe.

For CRS, to avoid such a collision situation, the CRS pattern may change in the first subframe in a burst. In the other subframes, a normal CRS pattern may still be used, as shown in FIG. 20. In another approach to avoid the collision between CRS and LBT, a new CRS pattern may be applied in all subframes on LAA carrier, as shown in FIG. 21. It should be noted that when the shifted CRS pattern is applied, the PDCCH region may also be shifted in the same manner as CRS, as shown in FIG. 22.

In an implementation where the LBT can be performed at any time and PDSCH transmission can start in the middle of a subframe, whether a RS pattern can be applied depends on how many symbols are in the first subframe. In one example, if the number of symbols in the last subframe of the burst is less than X OFDM symbols, then the last subframe should be dropped. For instance, if X=3 and only 1 or 2 OFDM symbols are available for DL transmission in the first subframe, then the last subframe should be dropped.

In another example, if the number of symbols in the last subframe of the burst is greater than or equal to X OFDM symbols, then either the partial CRS pattern or the shifted CRS pattern can be applied. For instance, if X=3 and 3 or more OFDM symbols are available for DL transmission in the first subframe, then either the partial CRS pattern or the shifted CRS pattern can be applied.

In a third approach to collision avoidance between LBT and RS, LBT may be performed at any position. The first and second approaches to collision avoidance between LBT and RS described above may be introduced at the same time. If the LBT can be performed at any time, a LAA transmission may start at any OFDM symbols. The first LAA subframe in a burst may have no OFDM symbols in the beginning of the subframe. The RS patterns (e.g., UE-RS pattern and CRS pattern) may follow the methods described in the second approach above. It should be noted that in this case, the M may be any value between (1, 13) for normal cyclic prefix (CP), and between (1, 11) for extended CP.

The last LAA subframe in a burst may have no OFDM symbols at the end of the subframe. The RS patterns (e.g., UE-RS pattern and CRS pattern) should follow the methods described in the first approach above. It should be noted that in this case, the M may be any value between (1, 13) for normal CP, and between (1, 11) for extended CP.

Although the above description mainly uses UE-RS and CRS, the possible implementations are not limited to UE-RS and CRS. For example, the above schemes may also be applied to DM-RS for EPDCCH by just replacing UE-RS with the DM-RS.

In summary, the UE 102 may recognize whether or not a specific RS pattern is used in a subframe. The UE 102 may detect (e.g., receive) RS in the subframe based on the RS pattern. The UE 102 may detect (e.g., receive) a PDSCH in the subframe and may perform rate matching of the PDSCH.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the eNB 160.

The UE operations module 124 may provide information 136 to the decoder 108. For example, the UE operations module 124 may inform the decoder 108 of an anticipated encoding for transmissions from the eNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the eNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the eNB 160. For instance, the one or more transmitters 158 may transmit during a UL subframe. The one or more transmitters 158 may upconvert and transmit the modulated signal(s) 156 to one or more eNBs 160.

The eNB 160 may include one or more transceivers 176, one or more demodulators 172, one or more decoders 166, one or more encoders 109, one or more modulators 113, a data buffer 162 and an eNB operations module 182. For example, one or more reception and/or transmission paths may be implemented in an eNB 160. For convenience, only a single transceiver 176, decoder 166, demodulator 172, encoder 109 and modulator 113 are illustrated in the eNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The eNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the eNB operations module 182 to perform one or more operations.

In general, the eNB operations module 182 may enable the eNB 160 to communicate with the one or more UEs 102. The eNB operations module 182 may include one or more of an eNB LAA transmission signaling module 194, a RS transmission module 196 and a PDSCH transmission module 198.

The eNB LAA transmission signaling module 194 may provide signaling for RS and PDSCH transmissions. The signaling may be explicit or implicit signaling. Alternatively, the eNB LAA transmission signaling module 194 may provide a semi-static configuration for the RS and PDSCH transmissions. This may be accomplished as described above.

The RS transmission module 196 may transmit one or more reference signals. This may be accomplished as described above.

The PDSCH transmission module 198 may transmit a PDSCH for which the same antenna port is used as for the reference signals.

In summary, the eNB 160 may configure an LAA SCell to a UE 102. The eNB 160 may perform CCA. The eNB 160 may transmit RS and PDSCH in the subframe where the CCA is performed. However, the RS pattern in the subframe where the CCA is performed may be different than the one for normal DL subframes. The eNB 160 may also transmit RS and PDSCH in the subframe where the CCA is not performed.

The eNB operations module 182 may provide information 188 to the demodulator 172. For example, the eNB operations module 182 may inform the demodulator 172 of a modulation pattern anticipated for transmissions from the UE(s) 102.

The eNB operations module 182 may provide information 186 to the decoder 166. For example, the eNB operations module 182 may inform the decoder 166 of an anticipated encoding for transmissions from the UE(s) 102.

The eNB operations module 182 may provide information 101 to the encoder 109. The information 101 may include data to be encoded and/or instructions for encoding. For example, the eNB operations module 182 may instruct the encoder 109 to encode information 101, including transmission data 105.

The encoder 109 may encode transmission data 105 and/or other information included in the information 101 provided by the eNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The eNB operations module 182 may provide information 103 to the modulator 113. This information 103 may include instructions for the modulator 113. For example, the eNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The eNB operations module 182 may provide information 192 to the one or more transmitters 117. This information 192 may include instructions for the one or more transmitters 117. For example, the eNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the eNB 160 to one or more UEs 102 and that a UL subframe may be transmitted from one or more UEs 102 to the eNB 160. Furthermore, both the eNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
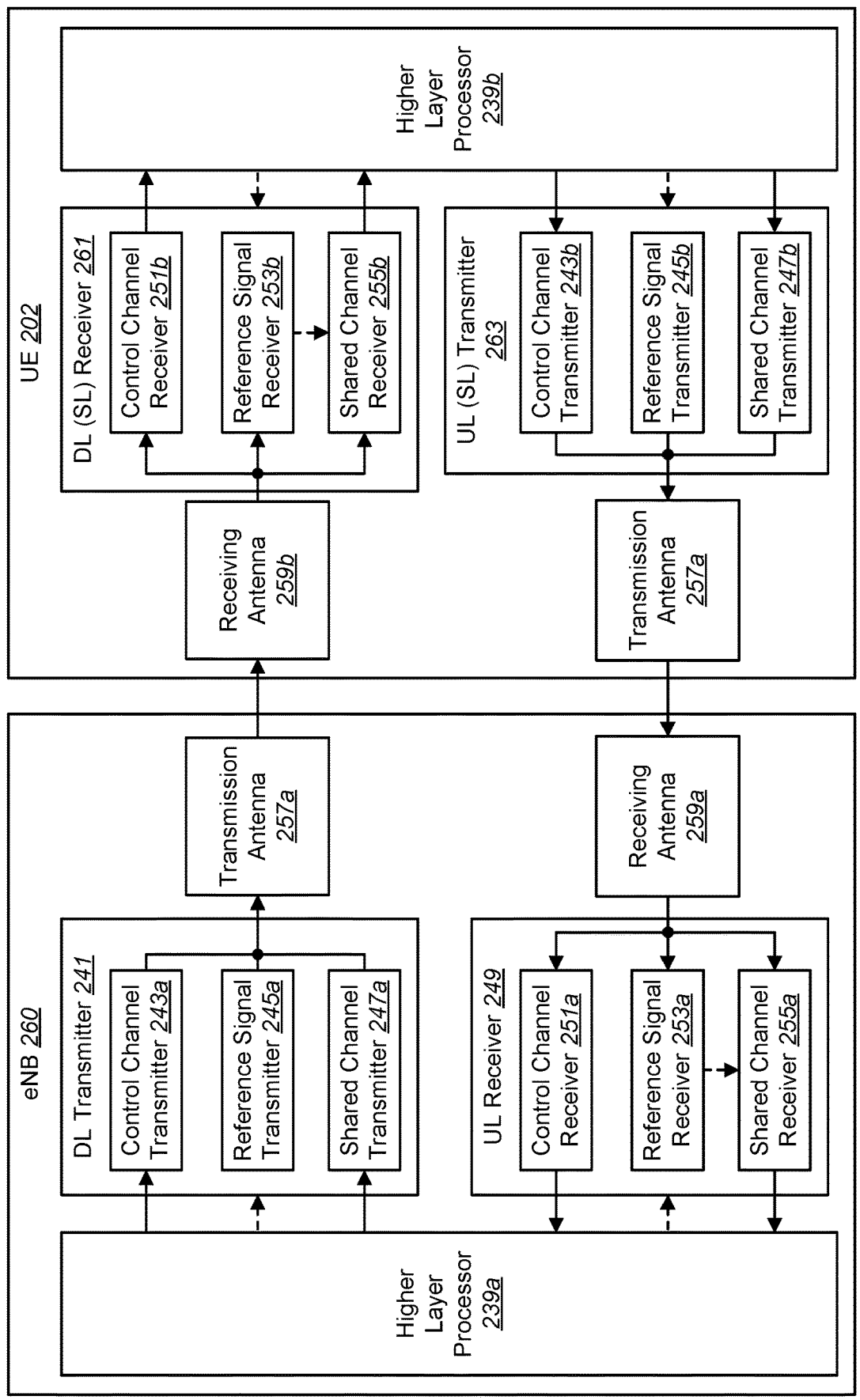
FIG. 2 is block diagram illustrating a detailed configuration of an eNB and a UE in which systems and methods for LAA may be implemented.

FIG. 2 is block diagram illustrating a detailed configuration of an eNB 260 and a UE 202 in which systems and methods for LAA may be implemented. The eNB 260 may include a higher layer processor 239a a DL transmitter 241 and a UL receiver 249. The higher layer processor 239a may communicate with the DL transmitter 241, UL receiver 249 and subsystems of each.

The DL transmitter 241 may include a control channel transmitter 243a, a reference signal transmitter 245a and a shared channel transmitter 247a. The DL transmitter 241 may transmit signals/channels to the UE 202 using a transmission antenna 257a.

The UL receiver 249 may include a control channel receiver 251a, a reference signal receiver 253a and a shared channel receiver 255a. The UL receiver 249 may receive signals/channels from the UE 202 using a receiving antenna 259a. The reference signal receiver 253a may provide signals to the shared channel receiver 255a based on the received reference signals.

The UE 202 may include a higher layer processor 239b a DL (SL) receiver 261 and a UL (SL) transmitter 263. The higher layer processor 239b may communicate with the DL (SL) receiver 261, UL (SL) transmitter 263 and subsystems of each.

The DL (SL) receiver 261 may include a control channel receiver 251b, a reference signal receiver 253b and a shared channel receiver 255b. The DL (SL) receiver 261 may receive signals/channels from the UE 202 using a receiving antenna 259b. The reference signal receiver 253b may provide signals to the shared channel receiver 255b based on the received reference signals. For example, the shared channel receiver 255b may be configured to receive the PDSCH for which the same antenna port is used as for the reference signals.

The UL (SL) transmitter 263 may include a control channel transmitter 243b, reference signal transmitter 245a and a shared channel transmitter 247b. The UL (SL) transmitter 263 may send signals/channels to the eNB 260 using a transmission antenna 257b.

Figure 3:
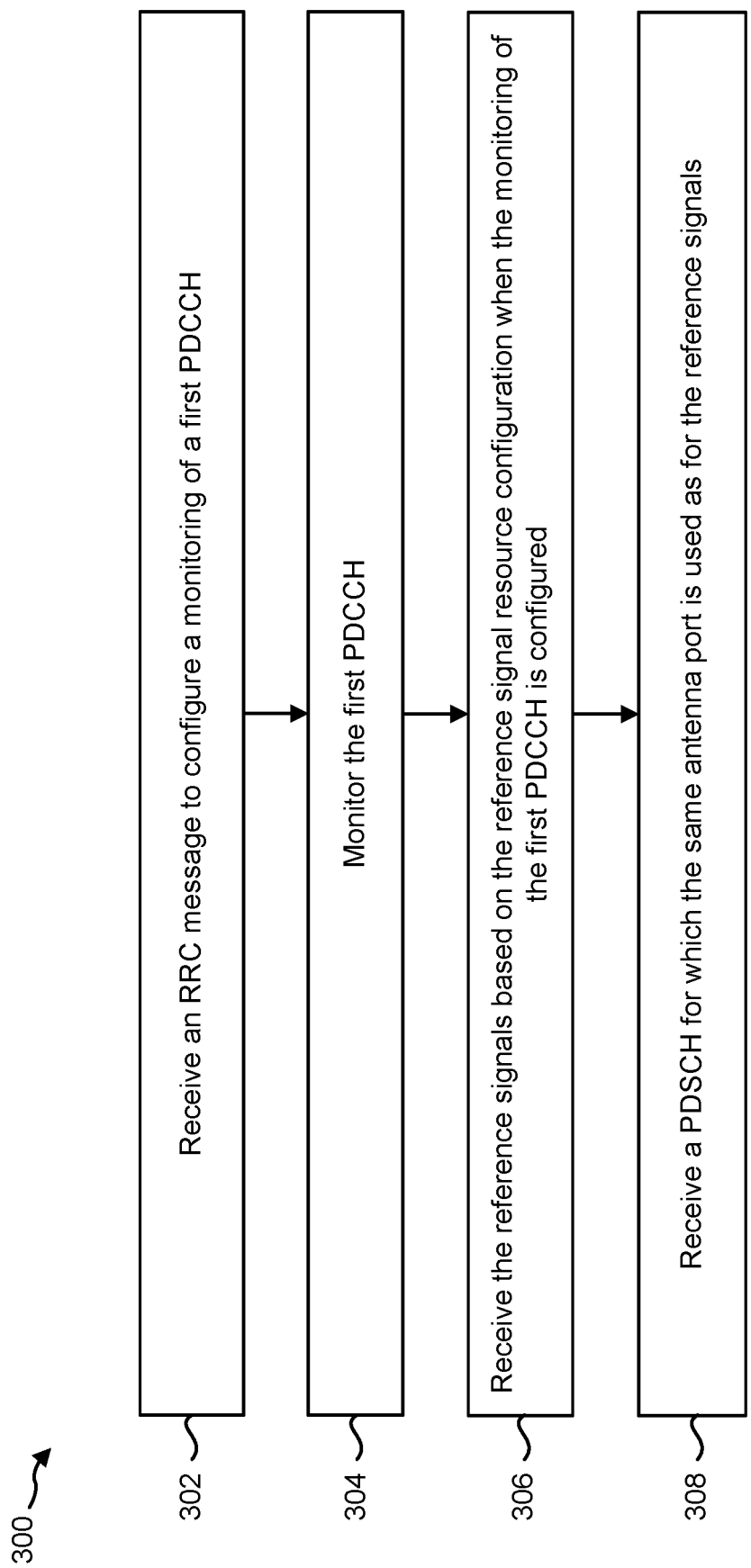
FIG. 3 is a flow diagram illustrating a method for LAA by a UE.

FIG. 3 is a flow diagram illustrating a method 300 for LAA by a UE 102. The UE 102 may communicate with one or more eNBs 160 in a wireless communication network. In one implementation, the wireless communication network may include an LTE network. In this method 300, the UE 102 may receive explicit signaling for receiving reference signals and a PDSCH.

The UE 102 may receive 302 an RRC message to configure a monitoring of a first PDCCH. For example, a higher layer processor 239b may be configured to receive the RRC message. The first PDCCH may include a downlink control information (DCI) format that has a field for indicating a reference signal resource configuration. The reference signal resource configuration may specify resource elements on reference signals that are mapped within a subframe.

The UE 102 may monitor 304 the first PDCCH. For example, a control channel receiver 251b may be configured to monitor the first PDCCH.

The UE 102 may receive 306 the reference signals based on the reference signal resource configuration when the monitoring of the first PDCCH is configured. For example, a reference signal receiver 253b may be configured to receive the reference signals.

The UE 102 may receive 308 a PDSCH for which the same antenna port is used as for the reference signals. For example, a shared channel receiver 255b may be configured to receive the PDSCH.

Figure 4:
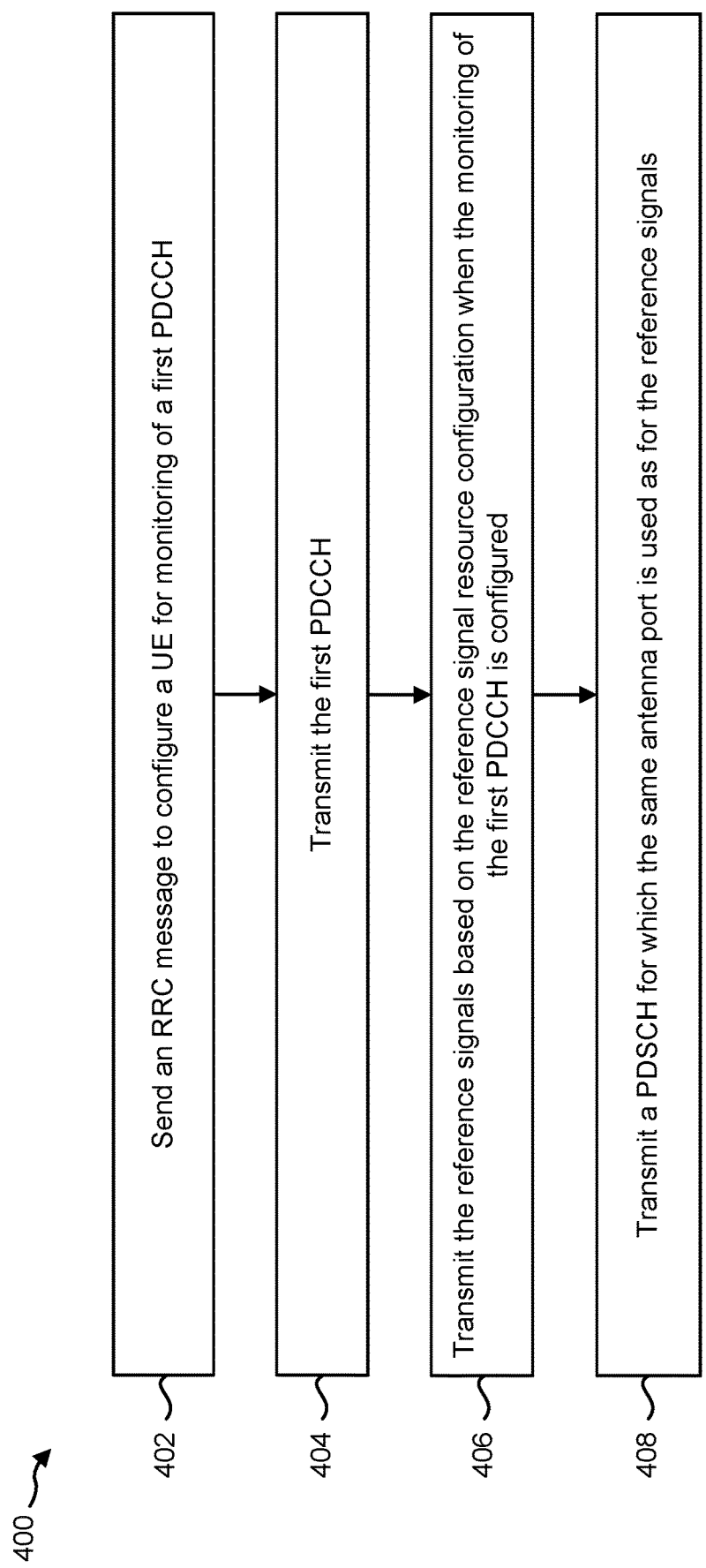
FIG. 4 is a flow diagram illustrating a method for LAA by an eNB.

FIG. 4 is a flow diagram illustrating a method 400 for LAA by an eNB 160. The eNB 160 may communicate with one or more UEs 102 in a wireless communication network. In one implementation, the wireless communication network may include an LTE network. In this method 400, the eNB 160 may send explicit signaling for transmitting reference signals and a PDSCH.

The eNB 160 may send 402 an RRC message to configure a UE 102 for monitoring of a first PDCCH. For example, a higher layer processor 239a may be configured to send the RRC message. The first PDCCH may include a DCI format that has a field for indicating a reference signal resource configuration. The reference signal resource configuration may specify resource elements on reference signals that are mapped within a subframe.

The eNB 160 may transmit 404 the first PDCCH. For example, a control channel transmitter 243a may be configured to transmit the first PDCCH.

The eNB 160 may transmit 406 the reference signals based on the reference signal resource configuration when the monitoring of the first PDCCH is configured. For example, a reference signal transmitter 245a may be configured to transmit the reference signals.

The eNB 160 may transmit 408 a PDSCH for which the same antenna port is used as for the reference signals. For example, a shared channel transmitter 247a may be configured to transmit the PDSCH.

Figure 5:
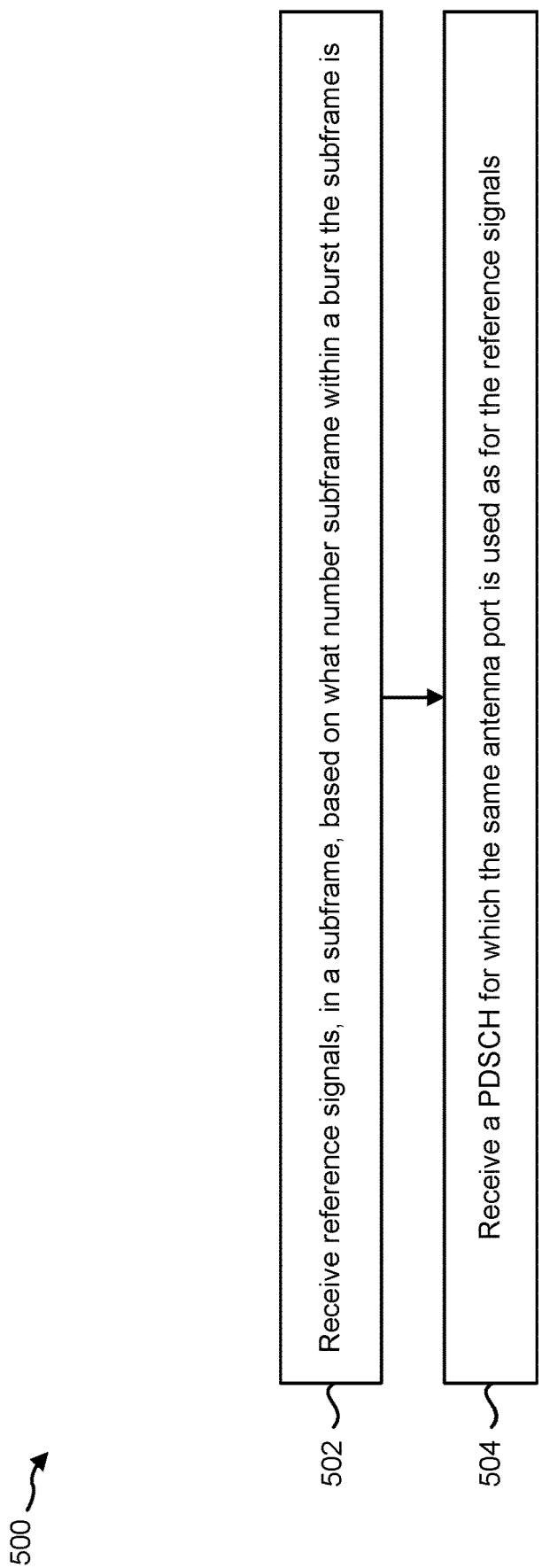
FIG. 5 is a flow diagram illustrating another method for LAA by a UE.

FIG. 5 is a flow diagram illustrating another method 500 for LAA by a UE 102. The UE 102 may communicate with one or more eNBs 160 in a wireless communication network. In one implementation, the wireless communication network may include an LTE network. In this method 500, the UE 102 may receive implicit signaling for receiving reference signals and a PDSCH.

The UE 102 may receive 502 reference signals, in a subframe, based on what number subframe within a burst the subframe is. For example, a reference signal receiver 253b may be configured to receive the reference signals. The number of the subframe within the burst may provide implicit signaling for receiving the reference signals.

The UE 102 may receive 504 a PDSCH for which the same antenna port is used as for the reference signals. For example, a shared channel receiver 255b may be configured to receive the PDSCH.

Figure 6:
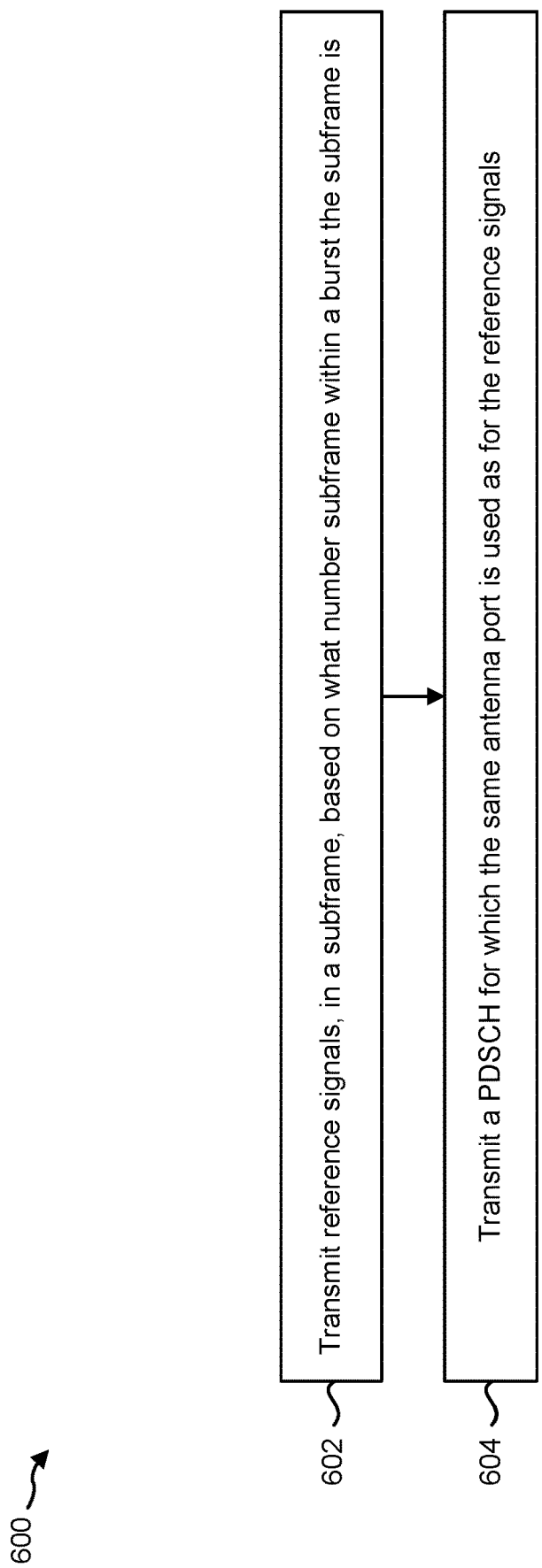
FIG. 6 is a flow diagram illustrating another method for LAA by an eNB.

FIG. 6 is a flow diagram illustrating another method 600 for LAA by an eNB 160. The eNB 160 may communicate with one or more UEs 102 in a wireless communication network. In one implementation, the wireless communication network may include an LTE network. In this method 600, the eNB 160 may send implicit signaling for transmitting reference signals and a PDSCH.

The eNB 160 may transmit 602 reference signals, in a subframe, based on what number subframe within a burst the subframe is. For example, a reference signal transmitter 245a may be configured to transmit the reference signals.

The eNB 160 may transmit 604 a PDSCH for which the same antenna port is used as for the reference signals. For example, a shared channel transmitter 247a may be configured to transmit the PDSCH using the same antenna port as the reference signals.

Figure 7:
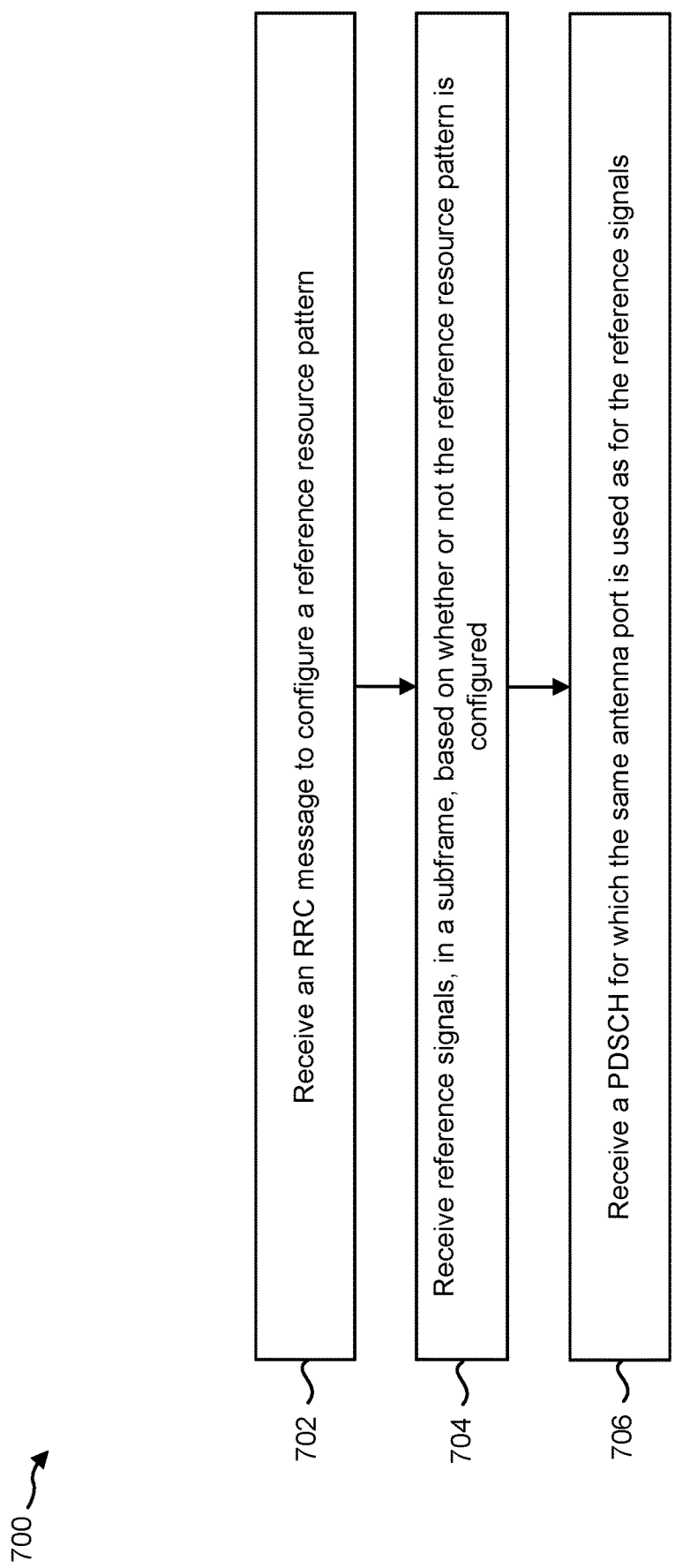
FIG. 7 is a flow diagram illustrating yet another method for LAA by a UE.

FIG. 7 is a flow diagram illustrating yet another method 700 for LAA by a UE 102. The UE 102 may communicate with one or more eNBs 160 in a wireless communication network. In one implementation, the wireless communication network may include an LTE network. In this method 700, the UE 102 may be semi-statically configured to receive reference signals and a PDSCH.

The UE 102 may receive 702 an RRC message to configure a reference resource pattern. For example, a higher layer processor 239b may be configured to receive the RRC message.

The UE 102 may receive 704 reference signals, in a subframe, based on whether or not the reference resource pattern is configured. For example, a reference signal receiver 253b may be configured to receive the reference signals.

The UE 102 may receive 706 a PDSCH for which the same antenna port is used as for the reference signals. For example, a shared channel receiver 255b may be configured to receive the PDSCH using the same antenna port as the reference signals.

Figure 8:
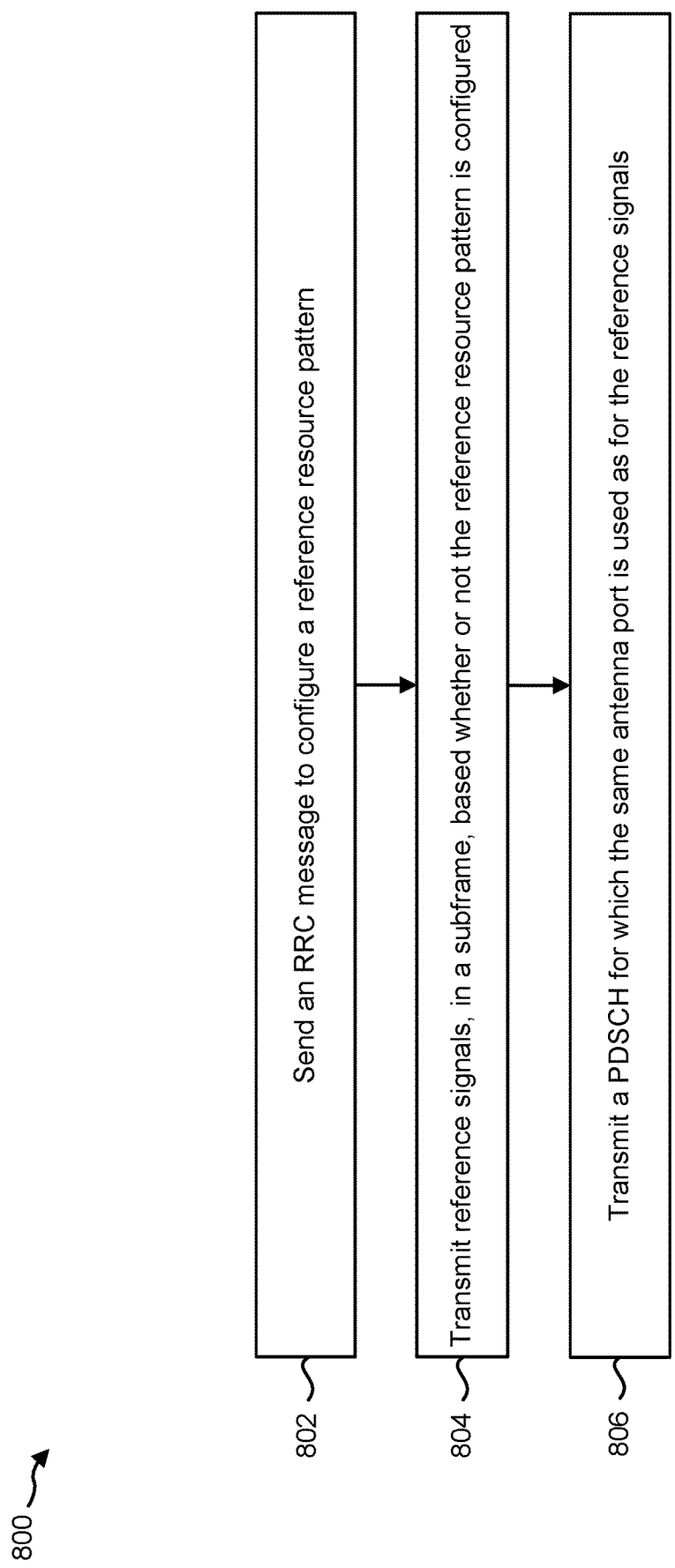
FIG. 8 is a flow diagram illustrating yet another method for LAA by an eNB.

FIG. 8 is a flow diagram illustrating yet another method 800 for LAA by an eNB. The eNB 160 may communicate with one or more UEs 102 in a wireless communication network. In one implementation, the wireless communication network may include an LTE network. In this method 800, the eNB 160 may provide a semi-static configuration to transmit reference signals and a PDSCH.

The eNB 160 may send 802 an RRC message to configure a reference resource pattern. For example, a higher layer processor 239a may be configured to send the RRC message.

The eNB 160 may transmit 804 reference signals, in a subframe, based whether or not the reference resource pattern is configured. For example, a reference signal transmitter 245a may be configured to transmit the reference signals.

The eNB 160 may transmit a PDSCH for which the same antenna port is used as for the reference signals. For example, a shared channel transmitter 247a may be configured to transmit the PDSCH using the same antenna port as the reference signals.

Figure 9:
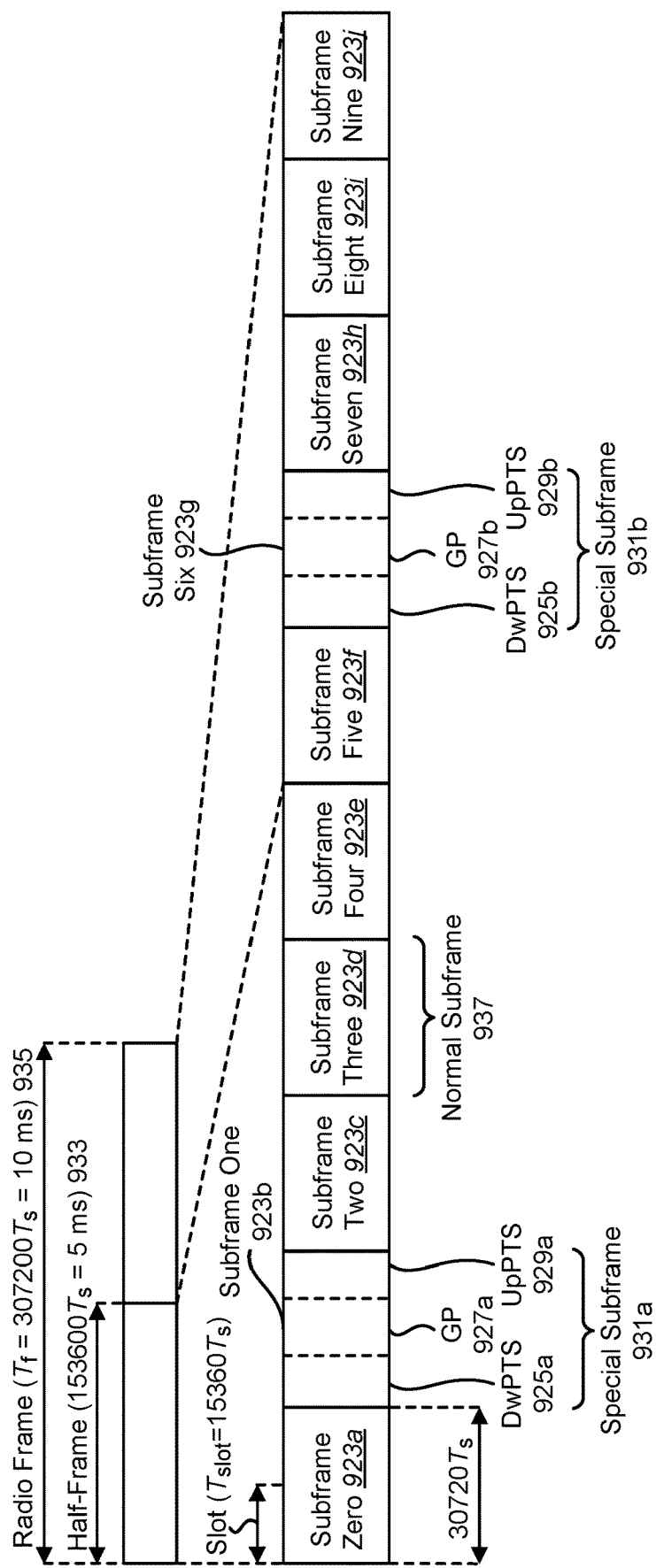
FIG. 9 is a diagram illustrating one example of a radio frame that may be used in accordance with the systems and methods disclosed herein.

FIG. 9 is a diagram illustrating one example of a radio frame 935 that may be used in accordance with the systems and methods disclosed herein. This radio frame 935 structure illustrates a TDD structure. Each radio frame 935 may have a length of $T_f=307200 \cdot T_s=10$ ms, where $T_f$ is a radio frame 935 duration and $T_s$ is a time unit equal to $$\frac{1}{(15000 \times 2048)}$$

seconds. The radio frame 935 may include two half-frames 933, each having a length of $153600 \cdot T_s=5$ ms. Each half-frame 933 may include five subframes 923a-e, 923f-j each having a length of $30720 \cdot T_s=1$ ms.

TDD UL/DL configurations 0-6 are given below in Table (1) (from Table 4.2-2 in 3GPP TS 36.211). UL/DL configurations with both 5 millisecond (ms) and 10 ms downlink-to-uplink switch-point periodicity may be supported. In particular, seven UL/DL configurations are specified in 3GPP specifications, as shown in Table (1) below. In Table (1), "D" denotes a downlink subframe, "S" denotes a special subframe and "U" denotes a UL subframe.

TABLE (1)

| TDD UL/DL Configuration Number | Downlink-to-Uplink Switch-Point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table (1) above, for each subframe in a radio frame, "D" indicates that the subframe is reserved for downlink transmissions, "U" indicates that the subframe is reserved for uplink transmissions and "S" indicates a special subframe with three fields: a downlink pilot time slot (DwPTS), a guard period (GP) and an uplink pilot time slot (UpPTS). The length of DwPTS and UpPTS is given in Table (2) (from Table 4.2-1 of 3GPP TS 36.211) subject to the total length of DwPTS, GP and UpPTS being equal to $30720 \cdot T_s=1$ ms. In Table (2), "cyclic prefix" is abbreviated as "CP" and "configuration" is abbreviated as "Config" for convenience.

TABLE (2)

| Special Subframe Config | Normal CP in downlink | | | Extended CP in downlink | | |
|---|---|---|---|---|---|---|
| | | UpPTS | | | UpPTS | |
| | DwPTS | Normal CP in uplink | Extended CP in uplink | DwPTS | Normal CP in uplink | Extended CP in uplink |
| 0 | $6592 \cdot T_S$ | $2192 \cdot T_S$ | $2560 \cdot T_S$ | $7680 \cdot T_S$ | $2192 \cdot T_S$ | $2560 \cdot T_S$ |
| 1 | $19760 \cdot T_S$ | | | $20480 \cdot T_S$ | | |
| 2 | $21952 \cdot T_S$ | | | $23040 \cdot T_S$ | | |
| 3 | $24144 \cdot T_S$ | | | $25600 \cdot T_S$ | | |
| 4 | $26336 \cdot T_S$ | | | $7680 \cdot T_S$ | $4384 \cdot T_S$ | $5120 \cdot T_S$ |
| 5 | $6592 \cdot T_S$ | $4384 \cdot T_S$ | $5120 \cdot T_S$ | $20480 \cdot T_S$ | | |
| 6 | $19760 \cdot T_S$ | | | $23040 \cdot T_S$ | | |
| 7 | $21952 \cdot T_S$ | | | — | — | — |
| 8 | $24144 \cdot T_S$ | | | — | — | — |

UL/DL configurations with both 5 ms and 10 ms downlink-to-uplink switch-point periodicity are supported. In the case of 5 ms downlink-to-uplink switch-point periodicity, the special subframe exists in both half-frames. In the case of 10 ms downlink-to-uplink switch-point periodicity, the special subframe exists in the first half-frame only. Subframes 0 and 5 and DwPTS may be reserved for downlink transmission. UpPTS and the subframe immediately following the special subframe may be reserved for uplink transmission.

In accordance with the systems and methods disclosed herein, some types of subframes 923 that may be used include a downlink subframe, an uplink subframe and a special subframe 931. In the example illustrated in FIG. 9, which has a 5 ms periodicity, two standard special subframes 931a-b are included in the radio frame 935. The remaining subframes 923 are normal subframes 937.

The first special subframe 931a includes a downlink pilot time slot (DwPTS) 925a, a guard period (GP) 927a and an uplink pilot time slot (UpPTS) 929a. In this example, the first standard special subframe 931a is included in subframe one 923b. The second standard special subframe 931b includes a downlink pilot time slot (DwPTS) 925b, a guard period (GP) 927b and an uplink pilot time slot (UpPTS) 929b. In this example, the second standard special subframe 931b is included in subframe six 923g. The length of the DwPTS 925a-b and UpPTS 929a-b may be given by Table 4.2-1 of 3GPP TS 36.211 (illustrated in Table (2) above) subject to the total length of each set of DwPTS 925, GP 927 and UpPTS 929 being equal to $30720 \cdot T_s = 1$ ms.

Each subframe i 923a-j (where i denotes a subframe ranging from subframe zero 923a (e.g., 0) to subframe nine 923j (e.g., 9) in this example) is defined as two slots, 2i and 2i+1 of length $T_{slot} = 15360 \cdot T_s = 0.5$ ms in each subframe 923. For example, subframe zero (e.g., 0) 923a may include two slots, including a first slot.

UL/DL configurations with both 5 ms and 10 ms downlink-to-uplink switch-point periodicity may be used in accordance with the systems and methods disclosed herein. FIG. 9 illustrates one example of a radio frame 935 with 5 ms switch-point periodicity. In the case of 5 ms downlink-to-uplink switch-point periodicity, each half-frame 933 includes a standard special subframe 931a-b. In the case of 10 ms downlink-to-uplink switch-point periodicity, a special subframe 931 may exist in the first half-frame 933 only.

Subframe zero (e.g., 0) 923a and subframe five (e.g., 5) 923f and DwPTS 925a-b may be reserved for downlink transmission. The UpPTS 929a-b and the subframe(s) immediately following the special subframe(s) 931a-b (e.g., subframe two 923c and subframe seven 923h) may be reserved for uplink transmission. It should be noted that, in some implementations, special subframes 931 may be considered DL subframes in order to determine a set of DL subframe associations that indicate UCI transmission uplink subframes of a UCI transmission cell.

LTE license access with TDD can have the special subframe as well as the normal subframe. The lengths of DwPTS, GP and UpPTS can be configured by using a special subframe configuration. Any one of the following ten configurations may be set as a special subframe configuration.

1) Special subframe configuration 0: DwPTS consists of 3 OFDM symbols. UpPTS consists of 1 single carrier frequency-division multiple access (SC-FDMA) symbol.

2) Special subframe configuration 1: DwPTS consists of 9 OFDM symbols for normal CP and 8 OFDM symbols for extended CP. UpPTS consists of 1 SC-FDMA symbol.

3) Special subframe configuration 2: DwPTS consists of 10 OFDM symbols for normal CP and 9 OFDM symbols for extended CP. UpPTS consists of 1 SC-FDMA symbol.

4) Special subframe configuration 3: DwPTS consists of 11 OFDM symbols for normal CP and 10 OFDM symbols for extended CP. UpPTS consists of 1 SC-FDMA symbol.

5) Special subframe configuration 4: DwPTS consists of 12 OFDM symbols for normal CP and 3 OFDM symbols for extended CP. UpPTS consists of 1 SC-FDMA symbol for normal CP and 2 SC-FDMA symbol for extended CP.

6) Special subframe configuration 5: DwPTS consists of 3 OFDM symbols for normal CP and 8 OFDM symbols for extended CP. UpPTS consists of 2 SC-FDMA symbols.

7) Special subframe configuration 6: DwPTS consists of 9 OFDM symbols. UpPTS consists of 2 SC-FDMA symbols.

8) Special subframe configuration 7: DwPTS consists of 10 OFDM symbols for normal CP and 5 OFDM symbols for extended CP. UpPTS consists of 2 SC-FDMA symbols.

9) Special subframe configuration 8: DwPTS consists of 11 OFDM symbols. UpPTS consists of 2 SC-FDMA symbols. Special subframe configuration 8 can be configured only for normal CP 10) Special subframe configuration 9: DwPTS consists of 6 OFDM symbols. UpPTS consists of 2 SC-FDMA symbols. Special subframe configuration 9 can be configured only for normal CP.

Figure 10:
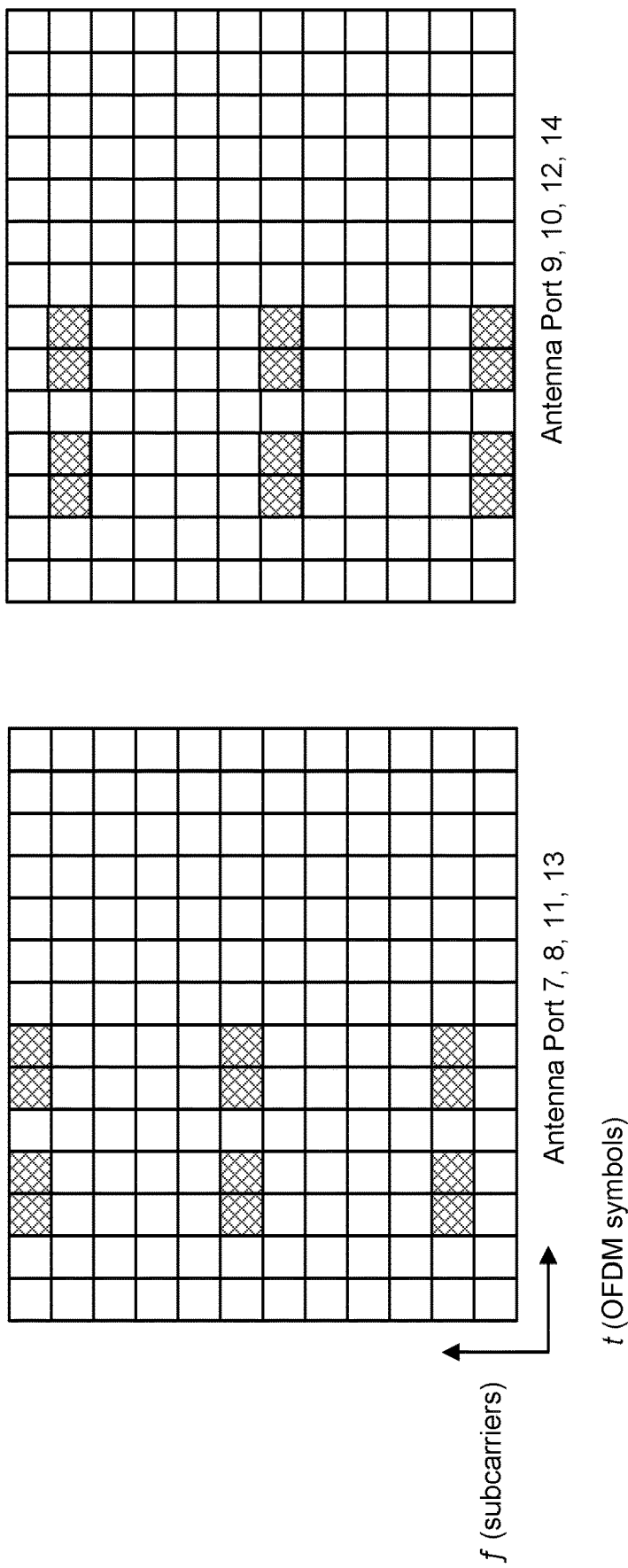
FIG. 10 illustrates an example of UE-reference signal (RS) for a special subframe with a normal cyclic prefix (CP)

FIG. 10 illustrates an example of UE-RS for a special subframe with a normal cyclic prefix (CP). In LTE license access, antenna ports 7-14 are supported for normal cyclic prefix. As shown in FIG. 10, a UE-RS for special subframe with special subframe configuration 1, 2, 6 or 7 and with normal CP may be located on OFDM symbols #2, #3, #5 and #6 that are in a DwPTS. This pattern (the pattern of the UE-RS-mapped REs within a special subframe) may be referred to as a "UE-RS pattern for special subframe."

Figure 11:
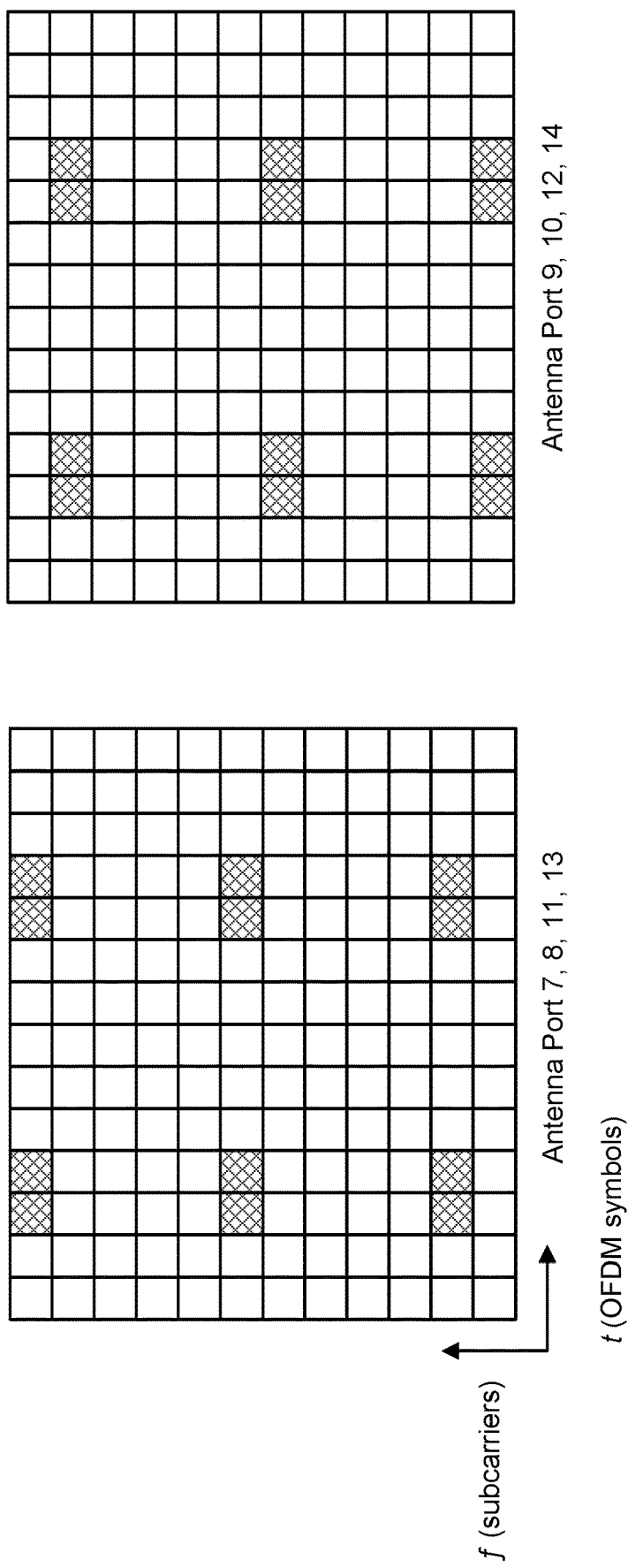
FIG. 11 illustrates another example of UE-RS for a special subframe with a normal CP.

FIG. 11 illustrates another example of UE-RS for a special subframe with a normal CP. As shown in FIG. 11, a UE-RS for a special subframe with a special subframe configuration 3, 4, 8 or 9 and with a normal CP may be located on OFDM symbol #2, #3, #9 and #10 that are in a DwPTS. OFDM symbol #9 and #10 are also referred to as OFDM symbol #2 and #3 in the second slot in the subframe. This pattern (the pattern of the UE-RS-mapped REs within a special subframe) may be referred to as a "UE-RS pattern for special subframe."

Figure 12:
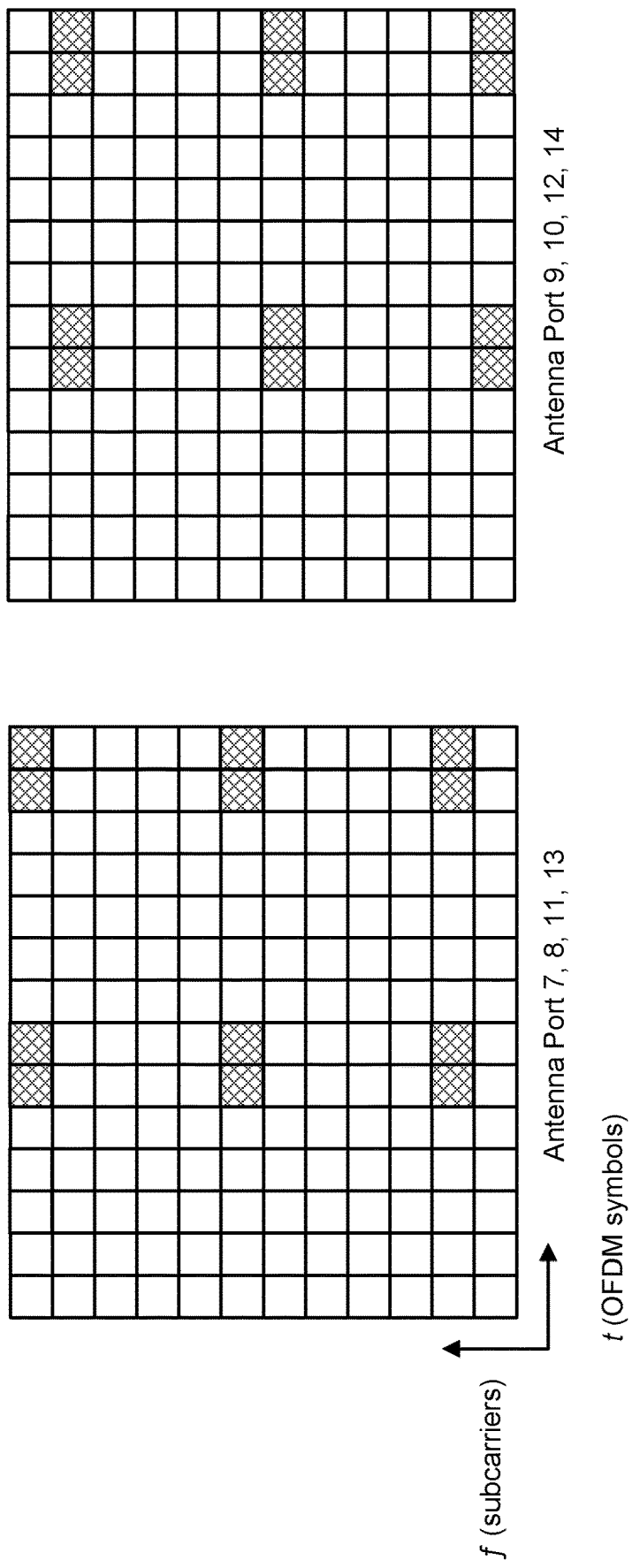
FIG. 12 illustrates an example of UE-RS for a normal subframe with a normal CP.

FIG. 12 illustrates an example of UE-RS for a normal subframe with a normal CP. As shown in FIG. 12, a UE-RS for normal subframe with normal CP may be located on OFDM symbol #5, #6, #12 and #13. OFDM symbol #12 and #13 are also referred to as OFDM symbol #5 and #6 in the second slot in the subframe. This pattern (the pattern of the UE-RS-mapped REs within a normal subframe) may be referred to as a "UE-RS pattern for normal subframe."

Figure 13:
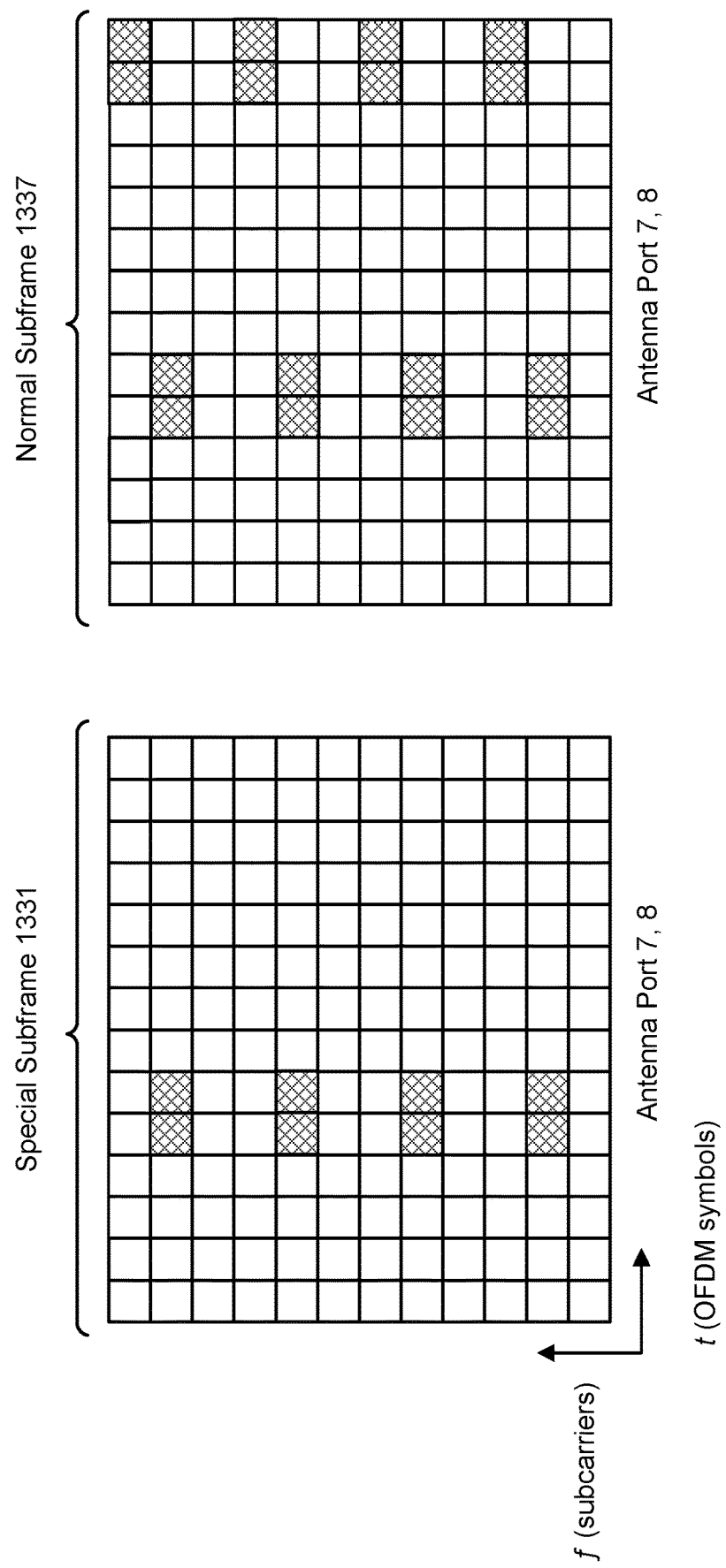
FIG. 13 illustrates an example of UE-RS for a special subframe and UE-RS for a normal subframe with an extended CP.

FIG. 13 illustrates an example of UE-RS for a special subframe 1331 and UE-RS for a normal subframe 1337 with an extended CP. In LTE license access, antenna ports antenna ports 7 and 8 are supported for extended CP.

For the special subframe 1331, UE-RS for the special subframe with special subframe configuration 1, 2, 3, 5 or 6 and with extended CP is located on OFDM symbol #5 and #6 that are in DwPTS. Special subframe configuration 4 with extended CP does not support PDSCH transmission.

For the normal subframe 1337, UE-RS for normal subframe with extended CP is located on OFDM symbol #5, #6, #11 and #12. OFDM symbol #11 and #12 are also referred to as OFDM symbol #5 and #6 in the second slot in the subframe.

Figure 14:
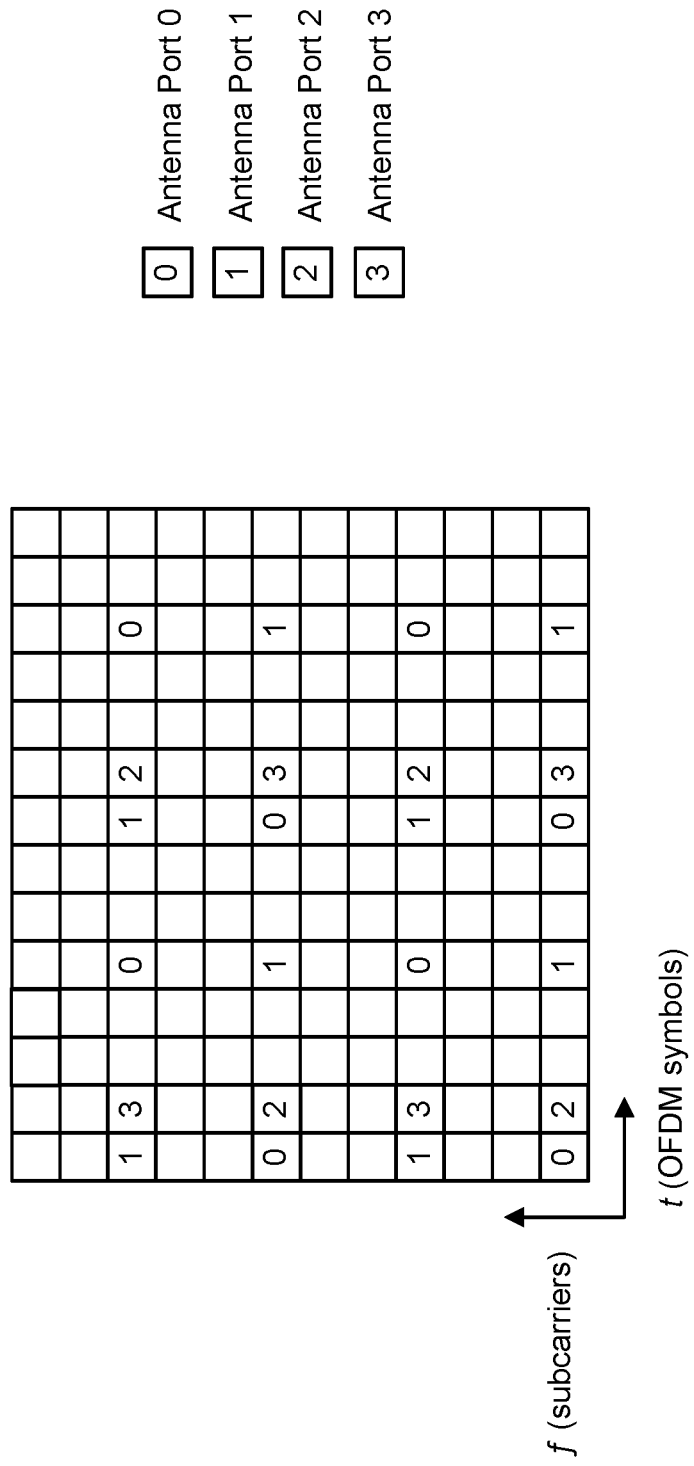
FIG. 14 illustrates an example of cell-specific reference signals (CRSs)

FIG. 14 illustrates an example of cell-specific reference signals (CRSs). As described above, CRSs may be transmitted on all DL normal subframe and DwPTS in a cell supporting PDSCH transmission. In LTE license access, antenna ports 0-3 for normal CP could be mapped on OFDM symbol #0, #1, #4, #7, #8 and #11, as shown in FIG. 14. OFDM symbol #7, #8 and #11 are also referred to as OFDM symbol #0, #1 and #4 in the second slot in the subframe. For extended CP, antenna ports 0-3 could be mapped on OFDM symbol #0, #1, #3, #6, #7 and #9. OFDM symbol #6, #7 and #9 are also referred to as OFDM symbol #0, #1 and #3 in the second slot in the subframe. This pattern (i.e., the pattern of the CRS-mapped REs within a normal subframe) may be referred to as "CRS pattern for a normal subframe." For a special subframe, if some of the above OFDM symbols are not in the DwPTS, then CRSs are not mapped on those OFDM symbols. This pattern (i.e., the pattern of the CRS-mapped REs within a special subframe) may be referred to as "CRS pattern for special subframe."

Figure 15:
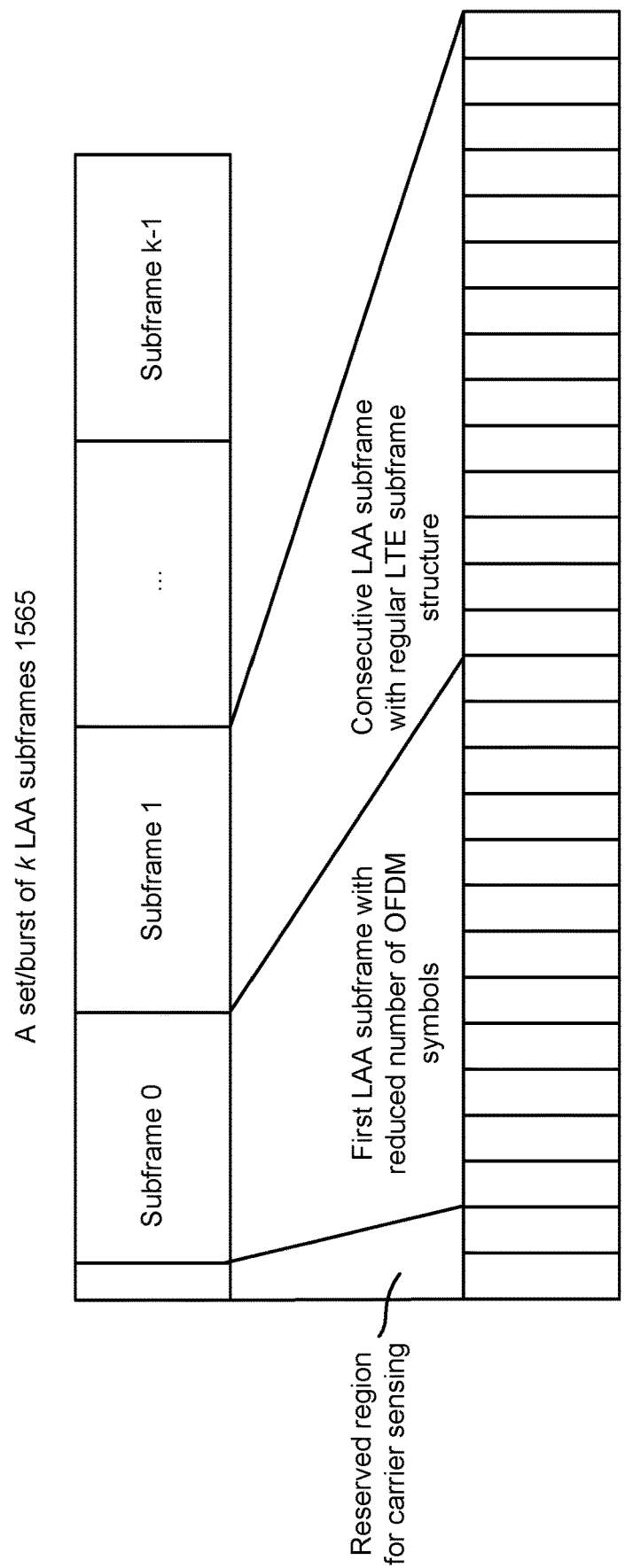
FIG. 15 illustrates an example of a LAA subframe burst transmission.

FIG. 15 illustrates an example of a LAA subframe burst transmission. This transmission may also be referred to as a LAA subframe set transmission. To provide fairness to other networks on the same unlicensed carrier, the eNB 160 may configure a maximum number of continuous subframe transmissions k in a LAA cell (e.g., a set of LAA subframes or a burst of LAA subframes 1565). The maximum transmission time in an unlicensed carrier may be different in different regions and/or countries based on the regulatory requirements.

In this example, the subframe is configured with normal cyclic prefix. The first two OFDM symbol lengths are reserved for carrier sensing. Thus, subframe 0 in a set of LAA subframes is a subframe with a reduced number of symbols. No sensing is necessary for continuous LAA subframe transmission after the first LAA subframe. The regular LTE subframe structure may be applied on consecutive subframes in a LAA subframe set.

It should be noted that the subframe index number in FIG. 15 refers to the index in a LAA subframe burst, instead of the subframe index in a radio frame as in legacy LTE cells.

Figure 16:
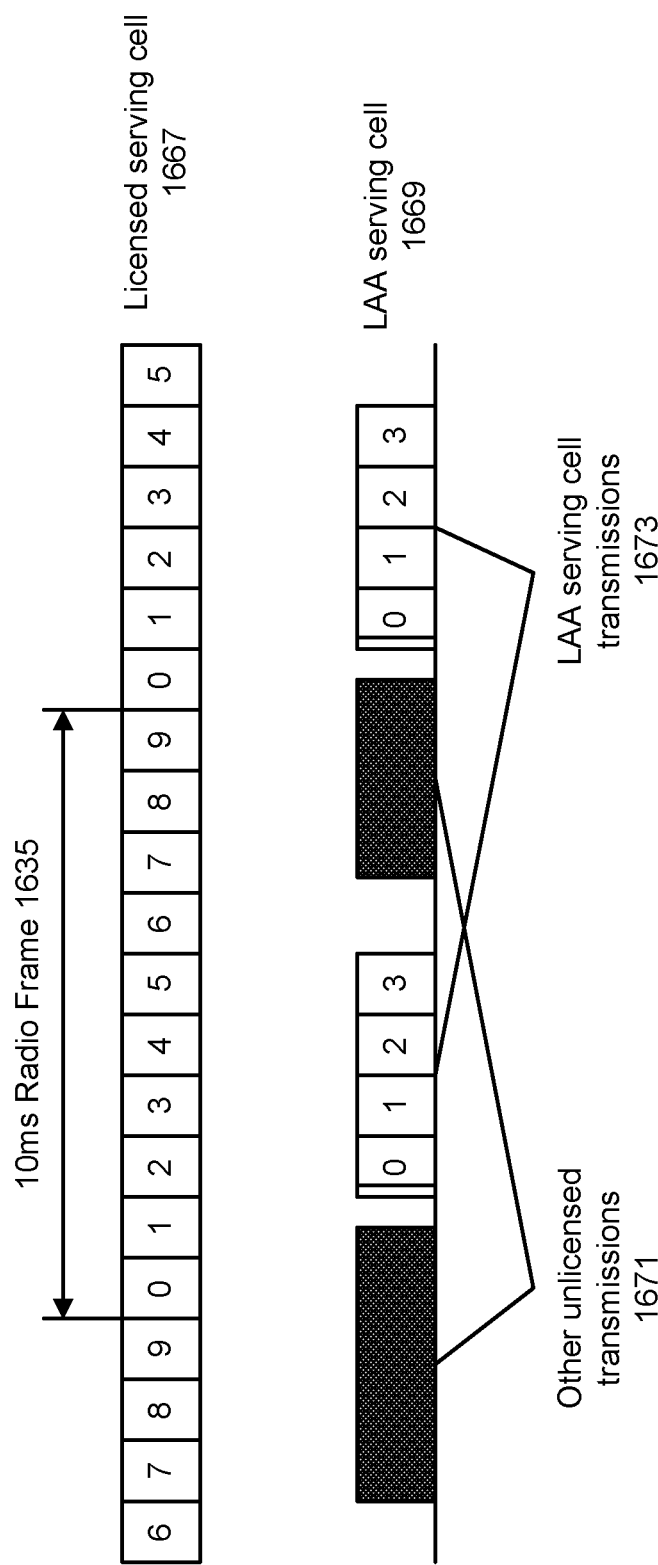
FIG. 16 illustrates an example of LAA coexistence with other unlicensed transmissions.

FIG. 16 illustrates an example of LAA coexistence with other unlicensed transmissions. A licensed serving cell 1667 is shown with a 10 ms radio frame 741. A LAA serving cell 1669 has LAA serving cell transmissions 1673 and other unlicensed transmissions 1671 (e.g., Wi-Fi or other LAA cells). Due to carrier sensing and deferred transmissions, the starting of a LAA transmission 1673 may be any subframe index in the radio frame 1635 of the licensed frame structure.

FIG. 17 illustrates an example of a LAA transmission gap 1773 due to LBT. A primary cell (PCell) 1767 is shown with a 10 ms radio frame. A LAA serving cell 1769 performs LAA serving cell transmissions. A first subframe in a burst 1775 is shown. A last subframe in a burst 1777 is also shown.

For an LAA carrier, the eNB 160 providing the LAA serving cell 1769 may perform LBT to ensure CCA 1771 prior to starting DL transmission. After ensuring CCA 1771, the eNB 160 may start to transmit DL signals immediately, otherwise some other nodes might begin to use the carrier. LBT may be performed just before or just after subframe boundaries. If LBT is performed in the middle of a subframe and PDSCH always starts and ends at subframe boundaries, at least a 1 ms gap 1773 may be needed between DL transmission bursts, as shown in FIG. 17.

FIG. 18 illustrates an example of performing LBT at the last part of a subframe 1877. A primary cell (PCell) 1867 is shown with a 10 ms radio frame. A LAA serving cell 1869 performs LAA serving cell transmissions.

The eNB 160 providing the LAA serving cell 1869 can transmit up to N subframes after performing LBT. But, at the last part of the last (the Nth) subframe in the burst 1877, the eNB 160 stops to transmit DL signals and performs LBT for the next burst 1879. In other words, the eNB 160 may puncture the last OFDM symbol in the last subframe within a burst 1877. To keep a time period to perform LBT, signals/channels (including UE-RS, DM-RS, CRS and PDSCH) are not mapped on the last M OFDM symbol(s).

Since the start of a subframe aligns with the subframe boundary, the CRS pattern of a normal DL subframe can be applied. However, when M is greater than 2, then some of the CRSs are not mapped, as is the case in a special subframe.

For the UE-RS pattern, if M=1 or 2 and if UE-RS pattern for normal subframe is used in this subframe, UE-RS for PDSCH and DM-RS for EPDCCH on the last M OFDM symbol(s) are not available. To avoid such a situation, the UE-RS pattern for a special subframe 1883 may be applied in the last subframe in a burst 1877, even if that subframe is not a special subframe (e.g., that subframe is a normal subframe). In this case, PRS and CSI-RS may not be transmitted, for example. In the other subframes, including the first subframe 1875, a UE-RS pattern for normal subframe 1881 may be used.

In this approach, the UE 102 has to know which RS pattern is used. There may be different schemes to share information about the RS pattern change. In a first scheme, the eNB 160 may transmit PDCCH or EPDCCH that indicates the RS pattern (or indicates whether or not some specific RS pattern, such as the RS pattern for a special subframe 1883, is applied in the subframe).

The UE 102 may receive the PDCCH or EPDCCH and may detect the RS based on the RS pattern. In other words, the UE 102 may be configured to monitor the PDCCH or EPDCCH with CRC scrambled by LAA-Radio Network Temporary Identifier (RNTI) which is different from any RNTIs used for PDCCH or EPDCCH indicating PDSCH transmission. For a serving cell (e.g., LAA SCell), if the UE 102 detects a PDCCH or EPDCCH with CRC scrambled by LAA-RNTI, the RS configuration (i.e., the RS pattern) may be given by the RS configuration indication signaled on the PDCCH or EPDCCH. Otherwise, the RS configuration may be given by the RS configuration for a normal subframe, as described above.

More specifically, the UE 102 may assume that the RS is mapped on the RE that is specified by the RS pattern. Then, the UE 102 may demodulate PDSCH using the detected RS as a reference. The RS pattern may be indicated using DCI format 1C or 1A and may be sent/monitored on a common search space (CSS) or a UE-specific search space (USS).

In a second scheme to share information about the RS pattern change, the eNB 160 may configure the UE 102 with a burst length. This may be done via a dedicated RRC message. The eNB 160 may transmit a PDCCH or EPDCCH in the first subframe in a burst 1875. The PDCCH or EPDCCH may indicate that a PDSCH transmission is supported in the burst. The PDCCH or EPDCCH may be transmitted by either the PCell, the LAA SCell or another SCell. Alternatively, the eNB 160 may transmit a specific signal (e.g. PSS/SSS, synchronization signal for LAA, DRS, a preamble sequence) in the first subframe in the burst 1875. The UE 102 can recognize the transmission burst by the detected PDCCH or EPDCCH (or the specific signal) and the configured burst length. The UE 102 may determine, in each subframe, the RS pattern on the basis of what number subframe in the burst the subframe is.

It should be noted that the eNB 160 may not always transmit PDSCH in all subframes in the burst, even if PDSCH is transmitted in the first subframe in the burst 1875.

With the second scheme above, the special subframe RS pattern 1883 may only be applied on the N-th subframe in a LAA subframe burst. If the LAA eNB 160 transmits fewer than N subframes in a LAA subframe burst, the normal subframe RS pattern 1881 may be applied on all subframes. With the explicit signaling of the first scheme above, even if the LAA eNB 160 transmits fewer than N subframes in a burst, the special subframe RS pattern 1883 may be configured on the last subframe of the LAA subframe burst 1877.

FIG. 19 illustrates another example of performing LBT at the last part of a subframe. A primary cell (PCell) 1967 is shown with a 10 ms radio frame. A LAA serving cell 1969 performs LAA serving cell transmissions.

As described above, the eNB 160 providing the LAA serving cell 1969 can transmit up to N subframes after performing LBT. But, at the last part of the last (the Nth) subframe in the burst 1977, the eNB 160 stops to transmit DL signals and performs LBT for the next burst 1979. In other words, the eNB 160 may puncture the last OFDM symbol in the last subframe within a burst 1977. To keep a time period to perform LBT, signals/channels, including UE-RS, DM-RS, CRS and PDSCH, are not mapped on the last M OFDM symbol(s).

In this example, the eNB 160 may avoid a collision between UE-RS and LBT by applying a UE-RS pattern for a special subframe in all subframes on the LAA carrier. The UE 102 may assume a unified RS pattern. In this instance, the eNB 160 may configure the UE 102 with an RS pattern (e.g., RS pattern for a special subframe 1983a,b) for the LAA SCell 1969. The first subframe in a burst 1775 may be configured with an RS pattern for a special subframe 1983a. The last subframe in a burst 1777 may also be configured with an RS pattern for a special subframe 1983b. The UE 102 may detect RS based on the configured RS pattern. Alternatively, the eNB 160 may just indicate that the SCell is an LAA SCell. In this implementation, the UE 102 may detect RS based whether the SCell is indicated as an LAA SCell.

FIG. 20 illustrates an example of performing LBT 2085 at the first part of a subframe. A primary cell (PCell) 2067 is shown with a 10 ms radio frame. A LAA serving cell 2069 performs LAA serving cell transmissions.

Once the eNB 160 ensures CCA, the eNB 160 may transmit up to N subframes starting with the subframe where the LBT 2085 is performed. In this case, at the first part of the first subframe in the burst 2075, the eNB 160 may stop to transmit DL signals. In other words, the eNB 160 may puncture the first OFDM symbol in the first subframe within a burst 2075. To keep a gap to perform LBT 2085, any signals/channels (including UE-RS, DM-RS, CRS, PDSCH and (E)PDCCH) are not mapped on the leading M OFDM symbol(s). If M=1 or 2, CRS on the leading M OFDM symbol(s) are not available.

For UE-RS, since the end of a subframe aligns with the subframe boundary, the UE-RS pattern of a normal DL subframe may be applied. In this case, if the shifted CRS collides with UE-RS, the UE-RS can be dropped. Alternatively, the UE-RS pattern may be also shifted in the same manner as the CRSshifting. In this case, some of the shifted UE-RS may get beyond the latter subframe boundary. Thus, such UE-RS may be dropped. Alternatively, the shifted pattern of the UE-RS that is for special subframes (e.g. UE-RS for special subframe configuration 1, 2, 6 or 7 with normal CP or UE-RS for special subframe configuration 1, 2, 3, 5, or 6 with extended CP) may be used so that all shifted UE-RS REs are located within the subframe.

For CRS, to avoid such a collision situation, the CRS pattern may change in the first subframe in a burst 2075. In the other subframes in the burst 2077, a normal CRS pattern may still be used as shown in FIG. 20.

In one example, a new CRS pattern may be the same as the normal CRS pattern except that CRS is not mapped on CRS on the leading M OFDM(s) in a subframe. Antenna ports 0-3 for normal CP may be mapped on OFDM symbol #4, #7, #8 and #11. For extended CP, antenna ports 0-3 may be mapped on OFDM symbol #3, #6, #7 and #9.

In another example, a new CRS pattern may be made by shifting the normal CRS pattern in the time domain. Preferably, each CRS may be mapped 2 OFDM symbols later compared with the normal CRS pattern. Antenna ports 0-3 for a normal CP may be mapped on OFDM symbol #2, #3, #6, #9, #10 and #13. For extended CP, antenna ports 0-3 may be mapped on OFDM symbol #2, #3, #5, #8, #9 and #11.

The UE 102 has to know which CRS pattern is used. It should be noted that in terms of sharing information about the CRS pattern change, the same schemes that are described for the UE-RS pattern change can be used, as described in connection with FIG. 20.

For the subframes other than the first subframe in the burst, all CRS can be used for demodulation and measurement.

FIG. 21 illustrates another example of performing LBT 2185 at the first part of a subframe. A primary cell (PCell) 2167 is shown with a 10 ms radio frame. A LAA serving cell 2169 performs LAA serving cell transmissions.

In this approach, to avoid the collision between CRS and LBT 2185, a new CRS pattern may be applied in all subframes on LAA carrier. In one implementation, the CRS is not mapped on the leading OFDM symbol(s) for each of the frames in a burst. In this implementation, RE mapping may or may not change. In another implementation, a new CRS pattern may be applied in all subframes in the burst. The UE 102 may assume a unified CRS pattern for each subframe. Examples of these implementations are depicted for the first subframe in a burst 2175 and other subframes in a burst 2177.

In this approach, the eNB 160 may configure the UE 102 with the new CRS pattern for the SCell (or may just indicate that the SCell is an LAA SCell). The UE 102 may detect RS based on the CRS pattern (or just if the SCell is indicated as an LAA SCell).

FIG. 22 illustrates yet another example of performing LBT 2285 at the first part of a subframe. A primary cell (PCell) 2267 is shown with a 10 ms radio frame. A LAA serving cell 2269 performs LAA serving cell transmissions.

The eNB 160 providing the LAA SCell may puncture the first OFDM symbol in the first subframe within a burst 2275. For the first subframe in a burst 2275, CRS on the leading symbol(s) cannot be used. A shifted CRS pattern may be applied to the other subframes in the burst 2277.

When a shifted CRS pattern is applied, the PDCCH 2287 region may also be shifted in the same manner as CRS. In this approach, PDCCH 2287 may be mapped on REs in the PDCCH region that includes 1, 2, 3 or 4 OFDM symbols and that starts with the M+1th OFDM symbol. The number of OFDM symbols included in the PDCCH region may be determined by a control format indicator (CFI) value. For example, PDCCH 2287 may be mapped on #2, #3 and #4 OFDM symbols.

In this approach, the UE 102 has to know which CRS pattern is used. In one implementation, the eNB 160 may send, in a subframe in the PCell (or another non-LAA serving cell), an (E)PDCCH 2287 that indicates that the shifted pattern is applied in the subframe in LAA carrier. If the UE 102 detects the (E)PDCCH 2287 in the subframe in the PCell, the UE 102 may attempt to decode PDCCH 2287 on the LAA carrier in the subframe on the basis of the shifted pattern. All CRS can be used for demodulation and measurement.

Figure 23:
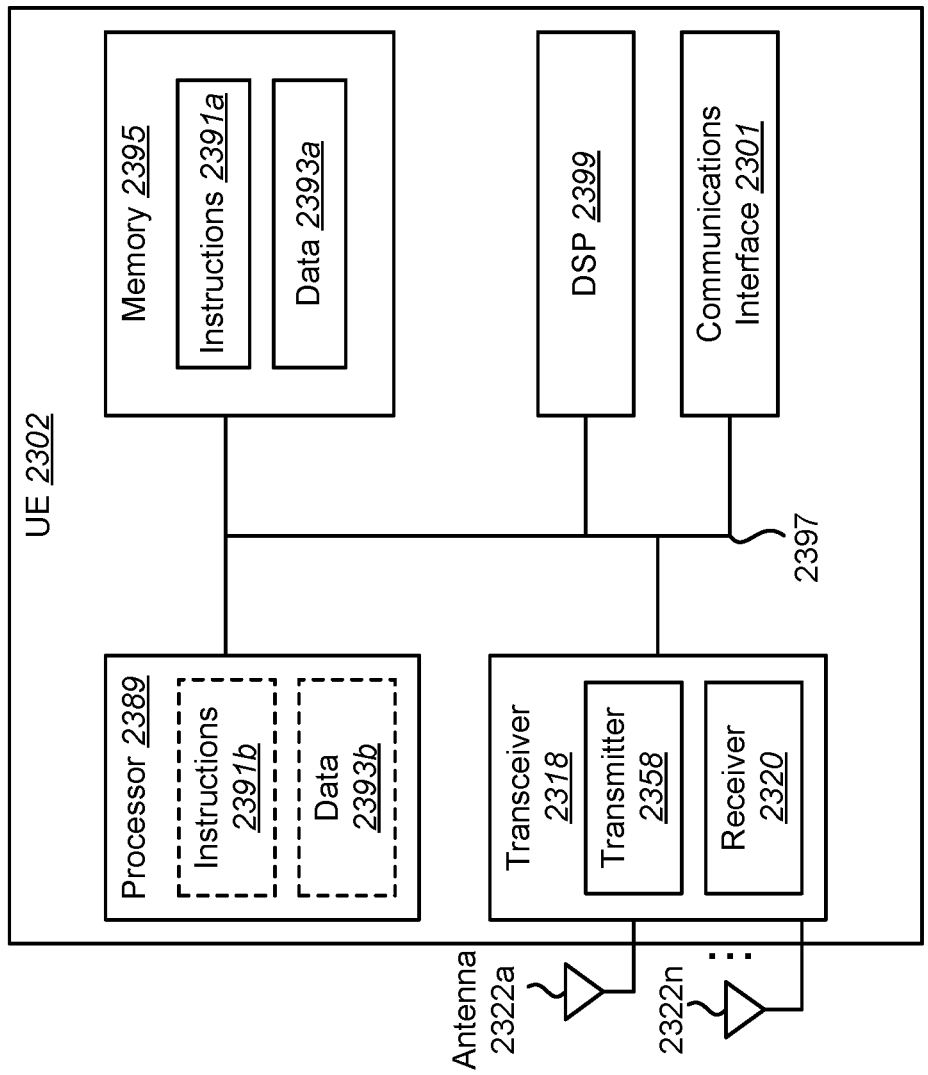
FIG. 23 illustrates various components that may be utilized in a UE.

FIG. 23 illustrates various components that may be utilized in a UE 2302. The UE 2302 described in connection with FIG. 23 may be implemented in accordance with the UE 102 described in connection with FIG. 1. The UE 2302 includes a processor 2389 that controls operation of the UE 2302. The processor 2389 may also be referred to as a central processing unit (CPU). Memory 2395, which may include read-only memory (ROM), random access memory (RAM), a combination of the two or any type of device that may store information, provides instructions 2391a and data 2393a to the processor 2389. A portion of the memory 2395 may also include non-volatile random access memory (NVRAM). Instructions 2391b and data 2393b may also reside in the processor 2389. Instructions 2391b and/or data 2393b loaded into the processor 2389 may also include instructions 2391a and/or data 2393a from memory 2395 that were loaded for execution or processing by the processor 2389. The instructions 2391b may be executed by the processor 2389 to implement one or more of the method 300, 500 and 700 described above.

The UE 2302 may also include a housing that contains one or more transmitters 2358 and one or more receivers 2320 to allow transmission and reception of data. The transmitter(s) 2358 and receiver(s) 2320 may be combined into one or more transceivers 2318. One or more antennas 2322a-n are attached to the housing and electrically coupled to the transceiver 2318.

The various components of the UE 2302 are coupled together by a bus system 2397, which may include a power bus, a control signal bus and a status signal bus, in addition to a data bus. However, for the sake of clarity, the various buses are illustrated in FIG. 23 as the bus system 2397. The UE 2302 may also include a digital signal processor (DSP) 2399 for use in processing signals. The UE 2302 may also include a communications interface 2301 that provides user access to the functions of the UE 2302. The UE 2302 illustrated in FIG. 23 is a functional block diagram rather than a listing of specific components.

Figure 24:
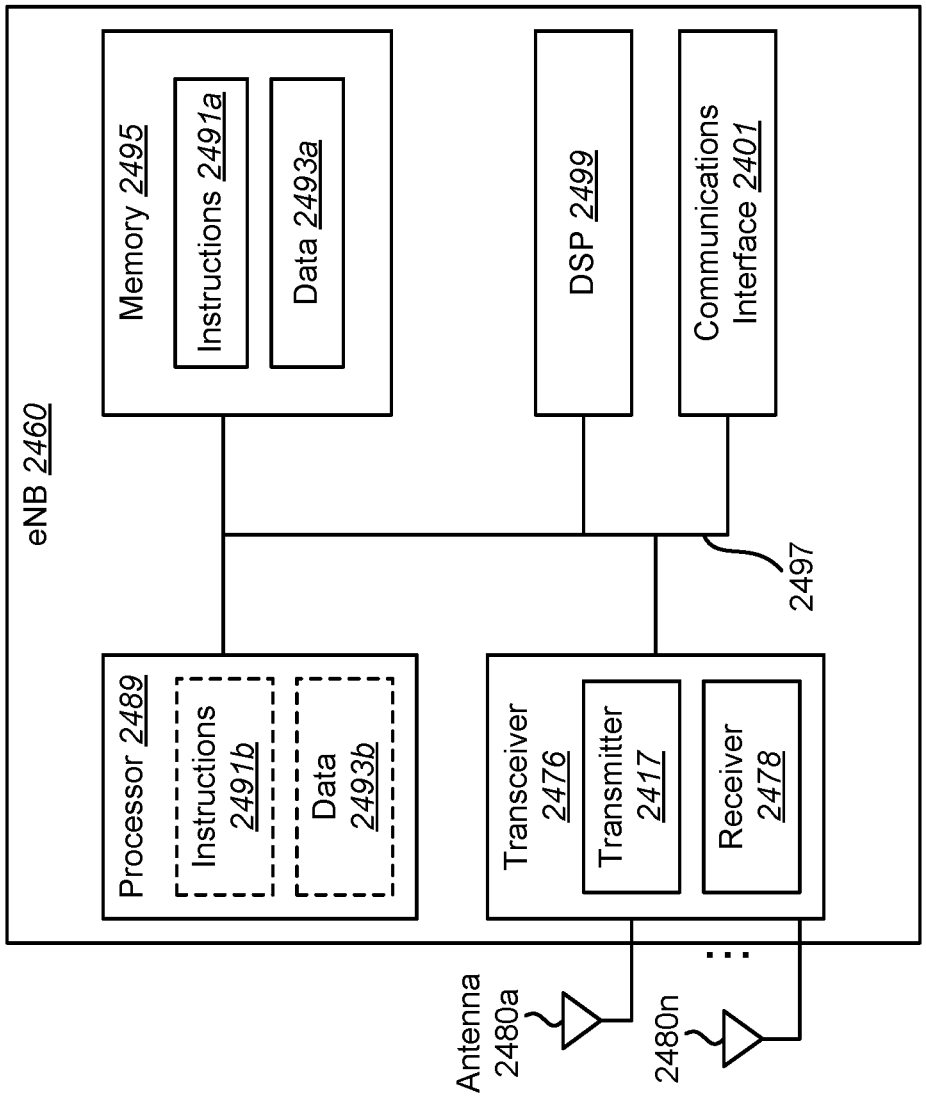
FIG. 24 illustrates various components that may be utilized in an eNB.

FIG. 24 illustrates various components that may be utilized in an eNB 2460. The eNB 2460 described in connection with FIG. 24 may be implemented in accordance with the eNB 160 described in connection with FIG. 1. The eNB 2460 includes a processor 2489 that controls operation of the eNB 2460. The processor 2489 may also be referred to as a central processing unit (CPU). Memory 2495, which may include read-only memory (ROM), random access memory (RAM), a combination of the two or any type of device that may store information, provides instructions 2491a and data 2493a to the processor 2489. A portion of the memory 2495 may also include non-volatile random access memory (NVRAM). Instructions 2491b and data 2493b may also reside in the processor 2489. Instructions 2491b and/or data 2493b loaded into the processor 2489 may also include instructions 2491a and/or data 2493a from memory 2495 that were loaded for execution or processing by the processor 2489. The instructions 2491b may be executed by the processor 2489 to implement one or more of the method 400, 600 and 800 described above.

The eNB 2460 may also include a housing that contains one or more transmitters 2417 and one or more receivers 2478 to allow transmission and reception of data. The transmitter(s) 2417 and receiver(s) 2478 may be combined into one or more transceivers 2476. One or more antennas 2480a-n are attached to the housing and electrically coupled to the transceiver 2476.

The various components of the eNB 2460 are coupled together by a bus system 2497, which may include a power bus, a control signal bus and a status signal bus, in addition to a data bus. However, for the sake of clarity, the various buses are illustrated in FIG. 24 as the bus system 2497. The eNB 2460 may also include a digital signal processor (DSP) 2499 for use in processing signals. The eNB 2460 may also include a communications interface 2401 that provides user access to the functions of the eNB 2460. The eNB 2460 illustrated in FIG. 24 is a functional block diagram rather than a listing of specific components.

Figure 25:
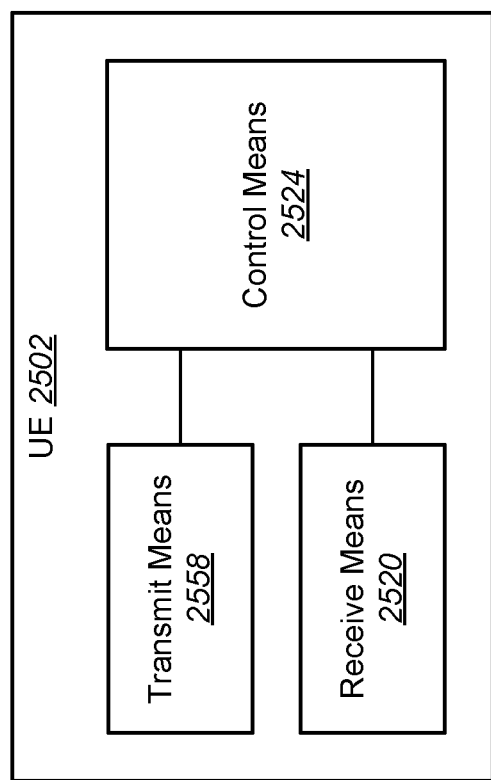
FIG. 25 is a block diagram illustrating one implementation of a UE in which systems and methods for performing LAA may be implemented.

FIG. 25 is a block diagram illustrating one implementation of a UE 2502 in which systems and methods for performing LAA may be implemented. The UE 2502 includes transmit means 2558, receive means 2520 and control means 2524. The transmit means 2558, receive means 2520 and control means 2524 may be configured to perform one or more of the functions described in connection with FIG. 1 above. FIG. 23 above illustrates one example of a concrete apparatus structure of FIG. 25. Other various structures may be implemented to realize one or more of the functions of FIG. 1. For example, a DSP may be realized by software.

Figure 26:
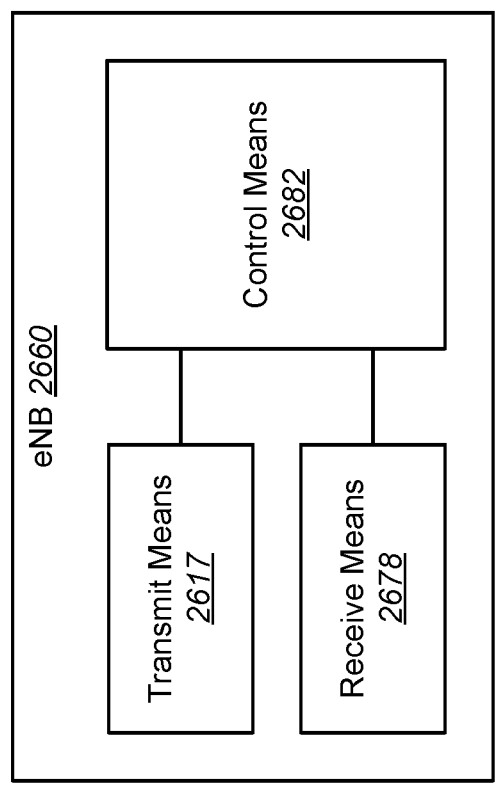
FIG. 26 is a block diagram illustrating one implementation of an eNB 2660 in which systems and methods for performing LAA may be implemented.

FIG. 26 is a block diagram illustrating one implementation of an eNB 2660 in which systems and methods for performing LAA may be implemented. The eNB 2660 includes transmit means 2617, receive means 2678 and control means 2682. The transmit means 2617, receive means 2678 and control means 2682 may be configured to perform one or more of the functions described in connection with FIG. 1 above. FIG. 24 above illustrates one example of a concrete apparatus structure of FIG. 26. Other various structures may be implemented to realize one or more of the functions of FIG. 1. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the eNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the eNB 160 and the UE 102 according to the systems and methods described above may be realized as an LSI that is a typical integrated circuit. Each functional block of the eNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

What is claimed is:

1. A user equipment (UE), comprising:
    a control channel receiver configured to monitor, in a license-assisted-access (LAA) cell, a first physical downlink control channel (PDCCH) and to monitor a second PDCCH, the first PDCCH including a downlink control information (DCI) format having a field for indicating a configuration for a subframe of the LAA cell, the configuration indicates whether or not only first several orthogonal frequency division multiplexing (OFDM) symbols among all OFDM symbols within the subframe are used for downlink transmission(s) in the subframe, the second PDCCH being a PDCCH of which detection indicates a transmission of a physical downlink shared channel (PDSCH) on the LAA cell;
    a reference signal receiver configured to receive reference signals of which resource element position within the subframe is determined depending on the configuration, transmission of the reference signals being comprised by the downlink transmission(s); and
    a shared channel receiver configured to receive the PDSCH assuming the same antenna port is used as for the reference signals.

2. The UE of claim 1, wherein:
    the DCI format is DCI format 1C, and
    the first PDCCH is with cyclic redundancy check (CRC) scrambled by LAA Radio Network Temporary Identifier (RNTI).

3. The UE of claim 1, wherein:
    the first PDCCH is monitored on the LAA cell.

4. The UE of claim 1, wherein:
    the reference signals are UE-specific reference signals, and
    the configuration indicates one of at least two states:
    in the first state, resource elements for mapping of the reference signals are located the same as UE-specific reference signal resource elements for a normal downlink subframe;
    in the second state, resource elements for mapping of the reference signals are located the same as UE-specific reference signal resource elements for a downlink pilot time slot (DwPTS) of a special subframe.

5. An evolved node B (eNB), comprising:
    a control channel transmitter configured to transmit, in a license-assisted-access (LAA) cell, a first physical downlink control channel (PDCCH) and to transmit a second PDCCH, the first PDCCH including a downlink control information (DCI) format having a field for indicating a configuration for a subframe of the LAA cell, the configuration indicates whether or not only first several orthogonal frequency division multiplexing (OFDM symbols among all OFDM symbols within the subframe are used for downlink transmission(s) in the subframe, the second PDCCH being a PDCCH of which detection indicates a transmission of a physical downlink shared channel (PDSCH) on the LAA cell;

a reference signal transmitter configured to transmit reference signals of which resource element position within the subframe is determined depending on the configuration, transmission of the reference signals being comprised by the downlink transmission(s); and a shared channel transmitter configured to transmit a PDSCH using the same antenna port as for the reference signals.

6. The eNB of claim 5, wherein:
the DCI format is DCI format 1C, and
the first PDCCH is with cyclic redundancy check (CRC) scrambled by LAA Radio Network Temporary Identifier (RNTI).

7. The eNB of claim 5, wherein:
the first PDCCH is transmitted on the LAA cell.

8. The eNB of claim 5, wherein:
the reference signals are user equipment (UE)-specific reference signals, and
the configuration indicates one of at least two states:
in the first state, resource elements for mapping of the reference signals are located the same as UE-specific reference signal resource elements for a normal subframe;
in the second state, resource elements for mapping of the reference signals are located the same as UE-specific reference signal resource elements for a downlink pilot time slot (DwPTS) of a special subframe.

9. A method for a user equipment (UE), the method comprising:
monitoring, in a license-assisted-access (LAA) cell, a first physical downlink control channel (PDCCH), the first PDCCH including a downlink channel information (DCI) format having a field for indicating a configuration for a subframe of the LAA cell, the configuration indicates whether or not only first several orthogonal frequency division multiplexing (OFDM) symbols among all OFDM symbols within the subframe are used for downlink transmission(s) in the subframe;
monitoring a second PDCCH, the second PDCCH being a PDCCH of which detection indicates a transmission of a physical downlink shared channel (PDSCH) on the LAA cell;
receiving reference signals of which resource element position within the subframe is determined depending on the configuration, transmission of the reference signals being comprised by the downlink transmission(s); and
receiving the PDSCH assuming the same antenna port is used as for the reference signals.

10. A method for an evolved node B (eNB), the method comprising:
transmitting, in a license-assisted-access (LAA) cell, a first physical downlink control channel (PDCCH), the first PDCCH including a downlink control information (DCI) format having a field for indicating a configuration for a subframe of the LAA cell, the configuration indicates whether or not only first several orthogonal frequency division multiplexing (OFDM) symbols among all OFDM symbols within the subframe are used for downlink transmission(s) in the subframe;
transmitting a second PDCCH, the second PDCCH being a PDCCH of which detection indicates a transmission of a physical downlink shared channel (PDSCH) on the LAA cell;
transmitting reference signals of which resource element position within the subframe is determined depending on the configuration, transmission of the reference signals being comprised by the downlink transmission(s); and
transmitting a PDSCH using the same antenna port as for the reference signals.

11. The UE of claim 1, wherein:
a rest of all OFDM symbols within the subframe other than the only first several OFDM symbols is each an OFDM symbol in which no data is placed.

12. The eNB of claim 5, wherein:
a rest of all OFDM symbols within the subframe other than the only first several OFDM symbols is each an OFDM symbol in which no data is placed.

* * * * *